US012207369B2

(12) United States Patent
Puvanakijjakorn

(10) Patent No.: US 12,207,369 B2
(45) Date of Patent: Jan. 21, 2025

(54) MULTIPLEXED SEGMENTED LIGHTING LAMINA

(71) Applicant: Wangs Alliance Corporation, Port Washington, NY (US)

(72) Inventor: Voravit Puvanakijjakorn, Port Washington, NY (US)

(73) Assignee: Wangs Alliance Corporation

(*) Notice: Subject to any disclaimer, the term of this patent is extended or adjusted under 35 U.S.C. 154(b) by 0 days.

(21) Appl. No.: 18/638,963

(22) Filed: Apr. 18, 2024

(65) Prior Publication Data

US 2024/0268008 A1 Aug. 8, 2024

Related U.S. Application Data

(63) Continuation of application No. 18/369,965, filed on Sep. 19, 2023, now abandoned, which is a
(Continued)

(51) Int. Cl.

| | |
|---|---|
| ***H05B 45/46*** | (2020.01) |
| ***F21S 4/24*** | (2016.01) |
| ***F21V 23/00*** | (2015.01) |
| ***F21Y 105/16*** | (2016.01) |
| ***F21Y 113/13*** | (2016.01) |

(Continued)

(52) U.S. Cl.

CPC ................ *H05B 45/46* (2020.01); *F21S 4/24* (2016.01); *F21V 23/005* (2013.01); *H05B 47/17* (2020.01); *H05B 47/175* (2020.01); *F21Y 2105/16* (2016.08); *F21Y 2113/13* (2016.08); *F21Y 2115/10* (2016.08)

(58) Field of Classification Search

None

See application file for complete search history.

(56) References Cited

U.S. PATENT DOCUMENTS 2,738,756 A 3/1956 Doane
3,104,064 A 9/1963 Bellek
(Continued)

FOREIGN PATENT DOCUMENTS

DE 102012101327 8/2012

OTHER PUBLICATIONS

International Search Report from International Application No. PCT/US2016/066395, pp. 1-6, dated Apr. 13, 2017.
(Continued)

*Primary Examiner* — Crystal L Hammond

(74) *Attorney, Agent, or Firm* — Weiss & Arons LLP

(57) ABSTRACT

Apparatus and methods for providing LED lighting on light tape and light sheet. A controller may provide lighting control data to one or more ICs on a segment of tape or sheet. The lighting control data may include a data packet. The data packet may include an address. The address may correspond to one or more of the ICs. The address may correspond to one or more LEDs on the segment. The address may correspond to one or more LEDs on a light tape. The address may correspond to one or more LEDs on a light sheet. The LEDs corresponding to the address may be controlled by a current regulator or regulators on a single IC. The LEDs corresponding to the address may be controlled by current regulators on different ICs.

30 Claims, 13 Drawing Sheets

Related U.S. Application Data continuation of application No. 17/557,388, filed on Dec. 21, 2021, now Pat. No. 11,812,532.

(60) Provisional application No. 63/213,290, filed on Jun. 22, 2021, provisional application No. 63/193,824, filed on May 27, 2021.

(51) Int. Cl.

| | |
|---|---|
| ***F21Y 115/10*** | (2016.01) |
| ***H05B 47/17*** | (2020.01) |
| ***H05B 47/175*** | (2020.01) |

(56) References Cited

U.S. PATENT DOCUMENTS 3,263,918 A 8/1966 Beachler et al.
3,629,682 A 12/1971 Boelter
4,495,463 A 1/1985 Milkovic
4,596,449 A 6/1986 Iwata et al.
4,739,457 A 4/1988 Orr
5,513,085 A 4/1996 Bourne
5,584,568 A 12/1996 Corbasson et al.
6,013,988 A 1/2000 Bucks et al.
6,084,476 A 7/2000 Hamanishi et al.
6,092,914 A 7/2000 Esakoff et al.
6,147,458 A 11/2000 Bucks et al.
6,149,283 A 11/2000 Conway et al.
6,155,693 A 12/2000 Spiegel et al.
6,250,774 B1 6/2001 Begemann et al.
6,290,368 B1 9/2001 Lehrer
6,390,647 B1 5/2002 Shaefer
6,424,102 B1 7/2002 Holtslag
6,459,919 B1 10/2002 Lys et al.
6,525,414 B2 2/2003 Shiraishi et al.
6,561,690 B2 5/2003 Balestriero et al.
6,586,890 B2 7/2003 Min et al.
6,641,283 B1 11/2003 Bohler
6,655,819 B2 12/2003 Loga et al.
6,788,011 B2 9/2004 Mueller et al.
6,806,659 B1 10/2004 Mueller et al.
7,015,825 B2 3/2006 Callahan
7,038,399 B2 5/2006 Lys et al.
7,109,668 B2 9/2006 Pogodayev et al.
7,192,162 B2 3/2007 Tanaka et al.
7,204,608 B2 4/2007 Beeman et al.
7,233,115 B2 6/2007 Lys
7,256,554 B2 8/2007 Lys
7,262,559 B2 8/2007 Tripathi et al.
7,326,179 B1 2/2008 Cienfuegos
7,352,138 B2 4/2008 Lys et al.
7,358,679 B2 4/2008 Lys et al.
7,445,365 B1 11/2008 Hsu
7,534,975 B1 5/2009 Sharrah et al.
7,737,643 B2 6/2010 Lys
7,837,866 B2 11/2010 Burrows
7,847,486 B2 12/2010 Ng
8,070,328 B1 12/2011 Knoble et al.
8,148,912 B2 4/2012 Kim
8,220,970 B1 7/2012 Khazi et al.
8,482,226 B2 7/2013 Vinther et al.
8,598,793 B2 12/2013 Yan et al.
8,662,709 B2 3/2014 Chang
8,708,535 B2 4/2014 Dalsgaard
8,905,587 B1 12/2014 Bouckaert
8,926,121 B2 1/2015 Wu
9,140,414 B1 9/2015 Beausoleil
9,140,431 B1 9/2015 Lee
9,157,591 B2 10/2015 Rozot et al.
9,204,519 B2 12/2015 Gan et al.
9,247,597 B2 1/2016 Miskin et al.
9,310,038 B2 4/2016 Athalye
9,544,967 B2 1/2017 Recker et al.
9,681,512 B1 6/2017 Xiong et al.
9,739,440 B1 8/2017 Deyaf et al.
9,784,440 B2 10/2017 Erdener et al.
10,139,060 B1 11/2018 Erdener et al.
10,190,757 B2 1/2019 Erdener et al.
10,208,935 B2 2/2019 Erdener
10,323,832 B2 6/2019 Erdener et al.
10,330,294 B2 6/2019 Erdener
10,378,747 B1 * 8/2019 Hanslip .................. H05B 45/20
10,465,888 B1 11/2019 Erdener et al.
10,571,101 B2 2/2020 Erdener et al.
10,598,358 B2 3/2020 Erdener et al.
10,631,386 B1 4/2020 McRae
10,920,971 B2 2/2021 Erdener et al.
10,941,930 B2 3/2021 Hatch et al.
10,969,088 B1 4/2021 Erdener et al.
2003/0063461 A1 4/2003 Tant
2003/0179585 A1 9/2003 Lefebvre
2004/0156189 A1 8/2004 Opolka
2005/0007777 A1 1/2005 Klipstein et al.
2005/0047134 A1 3/2005 Mueller et al.
2006/0262542 A1 11/2006 Ibbitson et al.
2007/0076415 A1 4/2007 Chou et al.
2007/0019415 A1 6/2007 Leblanc et al.
2007/0139913 A1 6/2007 Savage
2007/0222399 A1 9/2007 Bondy et al.
2008/0094828 A1 4/2008 Shao
2008/0123340 A1 5/2008 McClellan
2008/0273331 A1 11/2008 Moss et al.
2009/0021185 A1 1/2009 Ng
2009/0067172 A1 3/2009 Inoue et al.
2009/0073696 A1 3/2009 Melzner
2009/0079712 A1 3/2009 Levin et al.
2010/0036260 A1 2/2010 Zuluaga et al.
2010/0090613 A1 4/2010 Spartano
2010/0102751 A1 4/2010 Markel
2010/0127626 A1 5/2010 Altonen et al.
2010/0208371 A1 8/2010 Chao
2010/0226139 A1 9/2010 Lynch et al.
2010/0271804 A1 10/2010 Levine
2011/0080741 A1 4/2011 Noh
2011/0115399 A1 5/2011 Sadwick et al.
2011/0121752 A1 5/2011 Newman, Jr. et al.
2012/0056559 A1 3/2012 Fu et al.
2012/0069562 A1 3/2012 Singer et al.
2012/0139426 A1 6/2012 Ilyes et al.
2012/0153833 A1 6/2012 Mikani et al.
2012/0235582 A1 9/2012 Ido
2012/0243213 A1 9/2012 Chen
2013/0039055 A1 2/2013 Wilson et al.
2013/0063035 A1 3/2013 Baddela et al.
2013/0088152 A1 4/2013 Hagen
2013/0162150 A1 * 6/2013 Masuda ................. H05B 45/46
315/186
2013/0201671 A1 8/2013 Marcus et al.
2013/0223058 A1 8/2013 Briggs
2013/0249437 A1 9/2013 Wang et al.
2014/0015406 A1 1/2014 Fujiwara et al.
2014/0049967 A1 2/2014 Erdener et al.
2014/0119022 A1 5/2014 Beausoleil
2014/0160736 A1 6/2014 Chung et al.
2014/0300285 A1 10/2014 Medak
2014/0334157 A1 11/2014 Ferguson
2014/0361697 A1 12/2014 Miskin et al.
2014/0361967 A1 12/2014 Be et al.
2014/0362566 A1 12/2014 Tischler et al.
2014/0375203 A1 12/2014 Goscha et al.
2015/0028776 A1 1/2015 McMillan
2015/0115823 A1 4/2015 Serra et al.
2015/0159852 A1 6/2015 Dahlen et al.
2015/0198319 A1 * 7/2015 Salter ....................... B60Q 3/80
362/293
2015/0260385 A1 9/2015 Brynjolfsson
2015/0289334 A1 * 10/2015 Campbell .............. H05B 45/20
315/201
2015/0345733 A1 12/2015 Bobbo et al.
2015/0345765 A1 12/2015 Horst et al.
2016/0123563 A1 5/2016 Ferguson et al.
2016/0174325 A1 6/2016 Monjo
2016/0178173 A1 6/2016 Yadav et al.
2016/0234899 A1 8/2016 Reed et al.

(56) References Cited

U.S. PATENT DOCUMENTS

| | | | |
|---|---|---|---|
| 2016/0375162 | A1 | 12/2016 | Marry et al. |
| 2016/0375163 | A1 | 12/2016 | Hawkins et al. |
| 2017/0064790 | A1 | 3/2017 | Clark et al. |
| 2017/0130941 | A1 | 5/2017 | Ford |
| 2017/0164439 | A1 | 6/2017 | Reed |
| 2017/0171929 | A1 | 6/2017 | Erdener et al. |
| 2017/0171932 | A1 | 6/2017 | Puvanakijjakorn |
| 2017/0325311 | A1 | 11/2017 | Athalye |
| 2018/0013986 | A1 | 1/2018 | Chien |
| 2018/0031184 | A1 | 2/2018 | Yingchun |
| 2018/0156423 | A1 | 6/2018 | Murby |
| 2018/0320871 | A1 | 11/2018 | Clawson et al. |
| 2018/0376555 | A1 | 12/2018 | Wang et al. |
| 2019/0098723 | A1 | 3/2019 | Sadwick et al. |
| 2019/0098734 | A1 | 3/2019 | Dolan |
| 2019/0264899 | A1 | 8/2019 | Erdener |
| 2019/0313503 | A1 | 10/2019 | Woytowitz |
| 2019/0320515 | A1 | 10/2019 | Sadwick |
| 2020/0100334 | A1 | 3/2020 | Han |
| 2020/0284418 | A1 | 9/2020 | Hanslip |
| 2021/0239304 | A1 | 8/2021 | Erdener et al. |
| 2022/0003365 | A1 | 1/2022 | McRae |
| 2022/0201820 | A1 | 6/2022 | Kumar et al. |

OTHER PUBLICATIONS

Written Opinion of the International Searching Authority from International Application No. PCT/US2016/066395, pp. 1-8, dated Apr. 13, 2017.

"Trulux Canvas: LED Sheet-Static White (IP54) Installation Instructions," American Lighting, Inc., 2020.

"Trulux Canvas: LED Sheet-Tunable White (IP54) Installation Instructions," American Lighting, Inc., 2020.

* cited by examiner

MULTIPLEXED SEGMENTED LIGHTING LAMINA

CROSS-REFERENCE TO RELATED APPLICATIONS

This is a continuation of U.S. patent application Ser. No. 18/369,965, filed on Sep. 19, 2023, which is a continuation of U.S. patent application Ser. No. 17/577,388, filed on Dec. 21, 2021, now issued as U.S. Pat. No. 11,812,532, which is a non-provisional of U.S. Provisional Application No. 63/193,824, filed on Jun. 4, 2021, and of U.S. Provisional Application No. 63/213,290, filed on Jun. 22, 2021, both of which are hereby incorporated by reference in their entireties.

BACKGROUND

Lighting using light-emitting diodes ("LEDs") typically includes a current regulation circuit to provide different levels of brightness from an LED. Current regulation is typically provided by integrated circuits (ICs) that are disposed near the LED, and receive lighting control data from a controller. ICs are typically limited to a fixed number of current regulators, each of which is typically used to control brightness of LEDs of a particular color or correlated color temperature ("CCT"). The number of current regulators, therefore, may limit the number of colors or CCTs that may be controlled by the IC.

It would therefore be desirable to provide lighting circuits that have a number of colors or CCTs that is not limited by the number of current regulators in an IC.

BRIEF DESCRIPTION OF THE DRAWINGS

The objects and advantages of the invention will be apparent upon consideration of the following detailed description, taken in conjunction with the accompanying drawings, in which like reference characters refer to like parts throughout, and in which.

Figure 1:
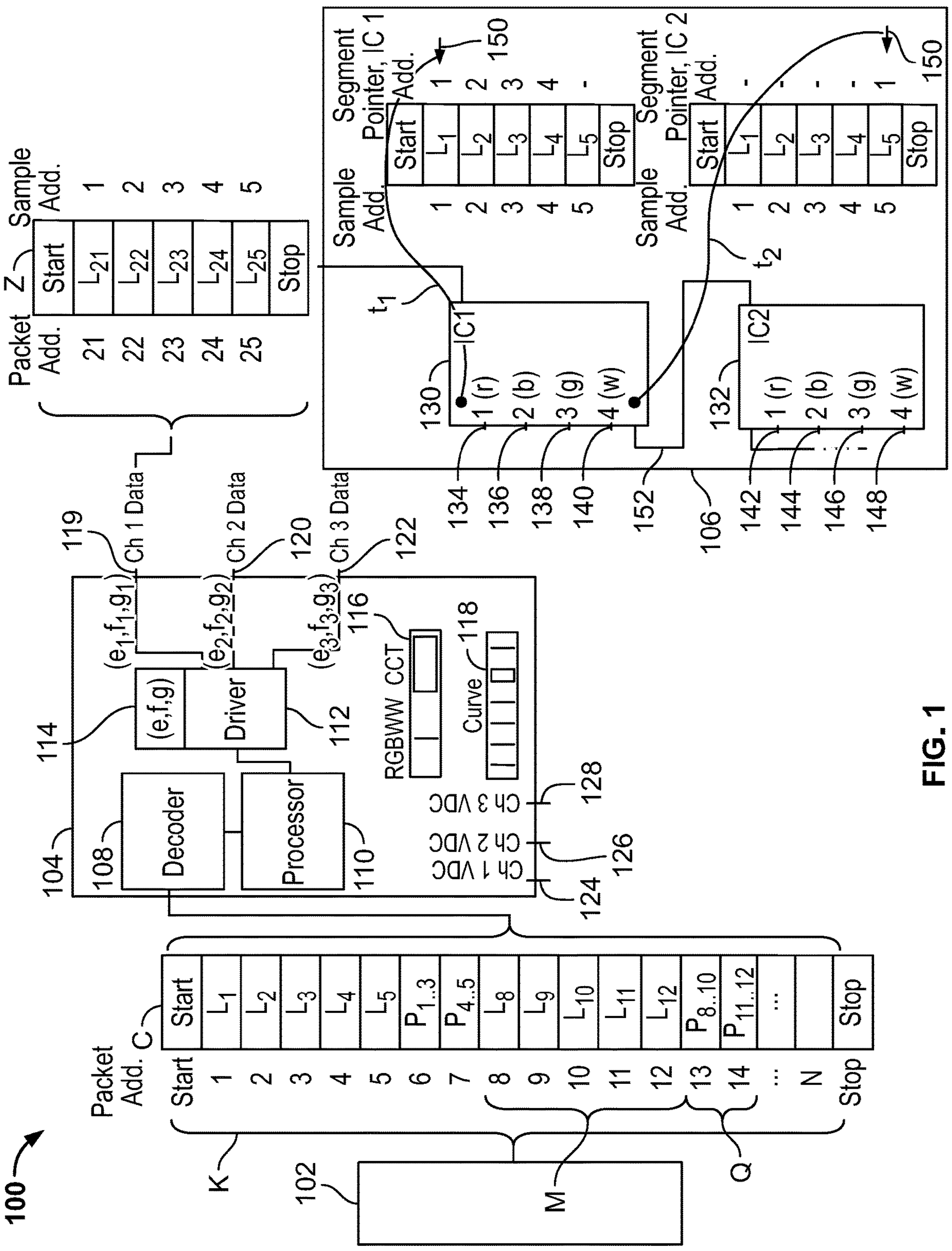
FIG. 1 shows schematically apparatus and information in accordance with the principles of the invention.

The leftmost digit (e.g., "L") of a three-digit reference numeral (e.g., "LRR"), and the two leftmost digits (e.g., "LL") of a four-digit reference numeral (e.g., "LLRR"), generally identify the first figure in which a part is called-out.

DETAILED DESCRIPTION

Apparatus and methods for lighting are provided. The apparatus may include a light-emitting diode ("LED") group. The group may include one or more LEDs. The group may be mounted to a lamina having break-away or cuttable connection to a lamina or laminae contiguous with the lamina.

The lamina may include one or more layers of one or more materials. The layers may include a printed circuit board circuit layer. The layers may include a dielectric layer. The layers may include a substrate. The circuit layer may be flexible. A flexible lamina may include not substrate. A rigid lamina may include a substrate. The substrate may include aluminum. The substrate may include fiberglass. The substrate may include glass. The substrate may include polymer.

Table 1 illustrates illustrative ranges of lamina thickness.

TABLE 1

Illustrative ranges for lamina thickness (in.)

| Range | | Range | | Range | | Range | |
|---|---|---|---|---|---|---|---|
| Lower | Upper | Lower | Upper | Lower | Upper | Lower | Upper |
| | <0.02 | | | | | | |
| 0.01 | 0.02 | 0.11 | 0.12 | 0.21 | 0.22 | 0.31 | 0.32 |
| 0.02 | 0.03 | 0.12 | 0.13 | 0.22 | 0.23 | 0.32 | 0.33 |
| 0.03 | 0.04 | 0.13 | 0.14 | 0.23 | 0.24 | 0.33 | 0.34 |
| 0.04 | 0.05 | 0.14 | 0.15 | 0.24 | 0.25 | 0.34 | 0.35 |
| 0.05 | 0.06 | 0.15 | 0.16 | 0.25 | 0.26 | 0.35 | 0.36 |
| 0.06 | 0.07 | 0.16 | 0.17 | 0.26 | 0.27 | 0.36 | 0.37 |
| 0.07 | 0.08 | 0.17 | 0.18 | 0.27 | 0.28 | 0.37 | 0.38 |
| 0.08 | 0.09 | 0.18 | 0.19 | 0.28 | 0.29 | 0.38 | 0.39 |
| 0.09 | 0.1 | 0.19 | 0.2 | 0.29 | 0.3 | 0.39 | 0.4 |
| 0.1 | 0.11 | 0.2 | 0.21 | 0.3 | 0.31 | >0.4 | |

Table 2 illustrates illustrative ranges of dielectric layer thickness.

TABLE 2

Illustrative ranges for dielectric layer thickness (in.)

| Range | | Range | | Range | |
|---|---|---|---|---|---|
| Lower | Upper | Lower | Upper | Lower | Upper |
| | <0.02 | | | | |
| 0.01 | 0.02 | 0.11 | 0.12 | 0.21 | 0.22 |
| 0.02 | 0.03 | 0.12 | 0.13 | 0.22 | 0.23 |
| 0.03 | 0.04 | 0.13 | 0.14 | 0.23 | 0.24 |
| 0.04 | 0.05 | 0.14 | 0.15 | 0.24 | 0.25 |
| 0.05 | 0.06 | 0.15 | 0.16 | 0.25 | 0.26 |
| 0.06 | 0.07 | 0.16 | 0.17 | 0.26 | 0.27 |
| 0.07 | 0.08 | 0.17 | 0.18 | 0.27 | 0.28 |
| 0.08 | 0.09 | 0.18 | 0.19 | 0.28 | 0.29 |
| 0.09 | 0.1 | 0.19 | 0.2 | 0.29 | 0.3 |
| 0.1 | 0.11 | 0.2 | 0.21 | >0.3 | |

The lamina may include one or more segments. A segment may be joined to one or more other segments at a separation line. Segments may have a shape, in plan view, that is rectangular, square, curved, parallelogrammatic, rhombic, trapezoidal, irregular, or any other suitable shape or form. Separation lines may be straight, curved, or have any suitable configuration. Segments may be contiguous. Segments may be non-contiguous. Two or more segments may be arranged along a first direction x. Two or more segments may be arranged along a second direction y. The first and second directions may be different. The first and second directions may be perpendicular to each other.

The group may be in electrical communication with an integrated circuit that is mounted on the lamina. The integrated circuit may be configured to receive input at three terminals. The integrated circuit may be configured to receive input at fewer than three terminals. The integrated circuit may be configured to receive input at more than three terminals. The integrated circuit may function to drive one or more LEDs based solely on input received from: 1) a high-voltage supply from the controller; 2) a data output from the controller; and 3) a low-voltage or reference voltage from the controller.

The integrated circuit may be configured to receive input at a first terminal. The first terminal may be designated to receive a user command. The user command may change an operational state of an LED.

The integrated circuit may be configured to receive input at a second terminal. The second terminal may be designated to receive an operational voltage to support IC operations.

The integrated circuit may be configured to receive input at a third terminal. The third terminal may be designated to receive a reference voltage.

The integrated circuit may be the only integrated circuit on the lamina. The lamina may include one or more segments.

The group may be mounted on the lamina. The group may be mounted in a segment of the lamina. One or more segments may support one or more groups.

The group may include a first LED. The group may include a second LED. The group may include a third LED. The group may include the first LED, the second LED and the third LED. The group may include only the first LED, the second LED and the third LED.

The group may include a red LED. The group may include a green LED. The group may include a blue LED. The group may include a white LED having a first CCT. The group may include a white LED having a second CCT. The second CCT may be different from the first CCT. The group may include the red LED, the green LED, the blue LED, the white LED having a first CCT and the white LED having a second CCT. The group may include only the red LED, the green LED, the blue LED, the white LED having a first CCT and the white LED having a second CCT.

The group may include a white LED having a first CCT. The group may include a white LED having a second CCT. The group may include a white LED having a third CCT. The third CCT may be different from the first CCT and the second CCT. The second CCT may be different from the first CCT. The group may include the white LED having a first CCT, the white LED having a second CCT, and the white LED having a third CCT. The group may include only the white LED having a first CCT, the white LED having a second CCT, and the white LED having a third CCT.

The LED may be configured to emit white light having a first CCT. The LED may be configured to emit white light having a second CCT that is different from the first CCT. The LED may be configured to emit white light having a first CCT and white light having a second CCT that is different from the first CCT.

The group may include a white LED having a first CCT; and a white LED having: a second CCT and a third CCT. The third CCT may be different from the first CCT and the second CCT. The second CCT may be different from the first CCT.

The user command may conform to a lighting format. The format may include a digital multiplexing format. Table 3 lists illustrative input formats.

TABLE 3

| Illustrative formats |
|---|
| DMX (e.g., in conformance with an American National Standards Institute standard "E1.11 - 2008, USITT DMX512-A", a/k/a "DMX512-A". |
| DALI (Digital Addressable Lighting Interface) |
| Triac or ELV (Phase cut dimmer signal) |
| 0-10 V dimmer signal |
| Z-wave (code and apparatus from Z-wave Alliance, Beaverton, Oregon) |
| Zigbee (code and apparatus from Zigbee Alliance, of San Ramon, California) |
| Custom-user defined |
| Default-provided in memory |
| Other third-party control protocol |
| Other suitable input formats |

Illustrative embodiments of apparatus and methods in accordance with the principles of the invention will now be described with reference to the accompanying drawings, which form a part hereof. It is to be understood that other embodiments maybe utilized, and that structural, functional and procedural modifications or omissions may be made without departing from the scope and spirit of the present invention.

Some embodiments may omit features shown and/or described in connection with the illustrative apparatus. Some embodiments may include features that are neither shown nor described in connection with the illustrative apparatus. Features of illustrative apparatus may be combined. For example, one illustrative embodiment may include features shown in connection with another illustrative embodiment.

Embodiments may involve some or all of the features of the illustrative apparatus and/or some or all of the steps of the methods associated therewith.

FIG. 1 shows illustrative architecture 100. Architecture 100 may include lighting control data generator 102. Architecture 100 may include controller 104. Architecture 100 may include lamina segment 106.

Lighting control data generator 102 may generate lighting control data packet C. Data Packet C may include fields that may be addressed as 1 . . . N. Fields 1 . . . N may include relative light level values such as $L_n$. $L_n$ values such as M may correspond to lighting branches of an LED array. The $L_n$ in corresponding to a branch may define the brightness of the branch relative to the other branches in the array.

Each branch may correspond to an LED color. For example, a first branch may correspond to red, a second branch to green, a third branch to blue, a fourth branch to a first CCT white, a fifth branch to a second CCT white, and a second branch to a third CCT white. A lamina segment may include one or more of such branches. The $L_n$ values may thus control the color-mixing in an array.

Fields 1 . . . N may include aggregate power levels such as $P_{a \ldots b}$, $P_{a \ldots b}$ values such as Q may correspond to the immediately preceding $L_n$ values.

The $P_{a \ldots b}$ may define the total power to be delivered to lighting branches corresponding to $L_8$, $L_9$ and $L_{10}$ based on the sum of power included in the individual currents allowed to flow through the branches, each in proportion to its relative light level ($L_8$, $L_9$ or $L_{10}$). For example, $P_{8 \ldots 10}$ may define the aggregate power to be provided to lighting branches corresponding to $L_8$, $L_9$ and $L_{10}$ based on control of current through the branches.

The $P_{a \ldots b}$ may define the total power provided to one or more lighting branches. For example, $P_{8 \ldots 10}$ may define the aggregate power to be directed to lighting branches corresponding to $L_8$, $L_9$ and $L_9$. For example, $P_{8 \ldots 10}$ may define the aggregate power to be directed to lighting branches corresponding to $L_8$, $L_9$ and $L_{10}$.

If $L_8$, $L_9$ and $L_{10}$ correspond, respectively, to a red lighting branch, a green lighting branch and a blue lighting branch, and $L_{11}$ and $L_{12}$ correspond, respectively to a first white CCT lighting branch and a second CCT lighting branch, then then $L_8$, $L_9$ and $L_{10}$ would define R-G-B mixing, $L_{11}$ and $L_{12}$ would correspond to CCT white light mixing. $P_{8 \ldots 10}$ would correspond to the aggregate R-G-B brightness, and $P_{11 \ldots 12}$ would correspond to aggregate CCT white brightness.

The $L_n$ may correspond to predetermined LED color selections. The $L_n$ of an array such as M may have a predetermined number of branches. Packet C may include one or more aggregate power values $P_{k=a \ldots b}$ for one or more of the different branches in the array.

Controller 104 may include decoder 108. Controller 104 may include processor 110. Controller 104 may include driver 112. Controller 104 may include selector 114. Controller 104 may include selector 114. Controller 104 may include switch 116. Controller 104 may include selector 118. Controller 104 may include data output channel 119. Controller 104 may include data output channel 120. Controller 104 may include data output channel 122. Controller 104 may include lighting voltage output 124. Controller 104 may include lighting voltage output 126. Controller 104 may include lighting voltage output 128. Decoder 108 may read data control packet C. Processor 110 may direct the $L_n$ to driver 112. Processor 110 may direct the $P_k$ to a power supply (not shown). The power supply may provide power in conformance with the $P_k$ to a lighting voltage output such as 124. Selector 114 may be used to identify digits that correspond to a selected first field in the N fields of data packet C for output at a data output channel such as 119. For example, if the three digits 0, 2, 21 are selected, the first value of packet C will be $L_{21}$. Such digits may be selected for each of the data output channels. A first $L_n$ of channel 1 is illustrated as $L_{21}$.

Controller 104 may output sample Z via data output channel 1. Sample Z may include relative light level values $L_{21}$, $L_{22}$, $L_{23}$, $L_{24}$, and $L_{25}$. The power supply may provide power alternatively corresponding to both $P_{21 \ldots 23}$ (not shown) and $P_{24 \ldots 25}$ (not shown), to channel 1 lighting voltage output 126. Thus, LEDs on channel 1 will have a color mixing determined by $L_{21}$-$L_{25}$ (for example, $L_{21}$-$L_{23}$ for R-G-B and $L_{24}$-$L_{25}$ for whites of two different CCTs) and an aggregate power for R-G-B and CCTs, respectively, determined by $P_{21 \ldots 23}$ and $P_{24 \ldots 25}$.

Lamina segment 106 may include one or more integrated circuits such as IC 1 130 and IC 2 132.

IC 1 130 may include current regulator 134. Current regulator 134 may be designated by a lighting format for a red lighting branch. IC 1 130 may include current regulator 136. Current regulator 136 may be designated by the lighting format for a blue lighting branch. IC 1 130 may include current regulator 138. Current regulator 138 may be designated by the lighting format for a green lighting branch. IC 1 130 may include current regulator 140. Current regulator 140 may be designated by the lighting format for a white lighting branch.

IC 2 132 may include current regulator 142. Current regulator 142 may be designated by the lighting format for a red lighting branch. IC 2 132 may include current regulator 144. Current regulator 144 may be designated by the lighting format for a blue lighting branch. IC 2 132 may include current regulator 146. Current regulator 146 may be designated by the lighting format for a green lighting branch. IC 2 132 may include current regulator 148. Current regulator 148 may be designated by the lighting format for a white lighting branch.

Under the format, IC 1 130 may recognize current regulator 134 as branch "1". Under the format, IC 1 130 may recognize current regulator 136 as branch "2". Under the format, IC 1 130 may recognize current regulator 138 as branch "3". Under the format, IC 1 130 may recognize current regulator 140 as branch "4".

Under the format, IC 2 132 may recognize current regulator 142 as branch "1". Under the format, IC 2 132 may recognize current regulator 144 as branch "2". Under the format, IC 2 132 may recognize current regulator 146 as branch "3". Under the format, IC 2 132 may recognize current regulator 148 as branch "4".

IC 1 130 and IC 2 132 may be configured to recognize a pointer such as 150. The pointer may identify in sample Z a "next" value to implement for lamina segment 106. At time $t_1$, pointer 150 may point to the first field, at address "1," in sample Z. IC 1 130 may apply the value from sample Z address 1 to IC 1 130's branch 1. IC 1 130 may apply the value from sample Z address 2 to IC 1 130's branch 2. IC 1 130 may apply the value from sample Z address 3 to IC 1 130's branch 3. IC 1 130 may apply the value from sample Z address 4 to IC 1 130's branch 4.

Jumper 152 may provide communication of pointer 150 from IC 1 130 to IC 2 132. IC 1 130 may at time $t_2$ pass the pointer to IC 2 132. IC 2 132 may then apply the value from sample Z address 5 to IC 1 132's branch 1. In this manner, sample Z may provide lighting control data to five branches that are spread out among IC 1 130 and IC 2 132.

If sample Z were configured to include a greater number of fields, IC 2 132, or one or more other ICs (not shown) could accommodate them in the same manner.

Switch 116 may be used to switch controller between a first mode, such as an R-G-B-W-W mode, as illustrated, and a second mode, such as a CCT mode. The modes of switch 116 may correspond to different syntaxes in data packet C. The mode of switch 116 may correspond to different IC arrangement on segment 106.

Selector 118 may provide two or more curves that may be used to calculate a lighting power from a $P_k$ value. A curve may be linear. A curve may be nonlinear.

Figure 2:
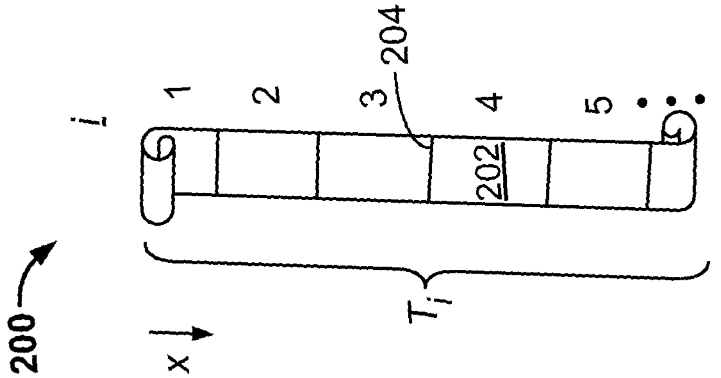
FIG. 2 shows schematically apparatus that may be used in accordance with the principles of the invention.

FIG. 2 shows schematically illustrative lamina 200. Lamina 200 may have a one-dimensional (tape, extending in y direction) layout of segments.

Lamina 200 may include one or more segments such as segment 202. Segment 202 may be joined to one or more other segments at a separation line such as 204. Two or more segments may be arranged along direction x. The segments may be identified as $T_i$, with i=1, 2, 3, . . . , I. The $T_i$ segments may be referred to as a column.

Figure 3:
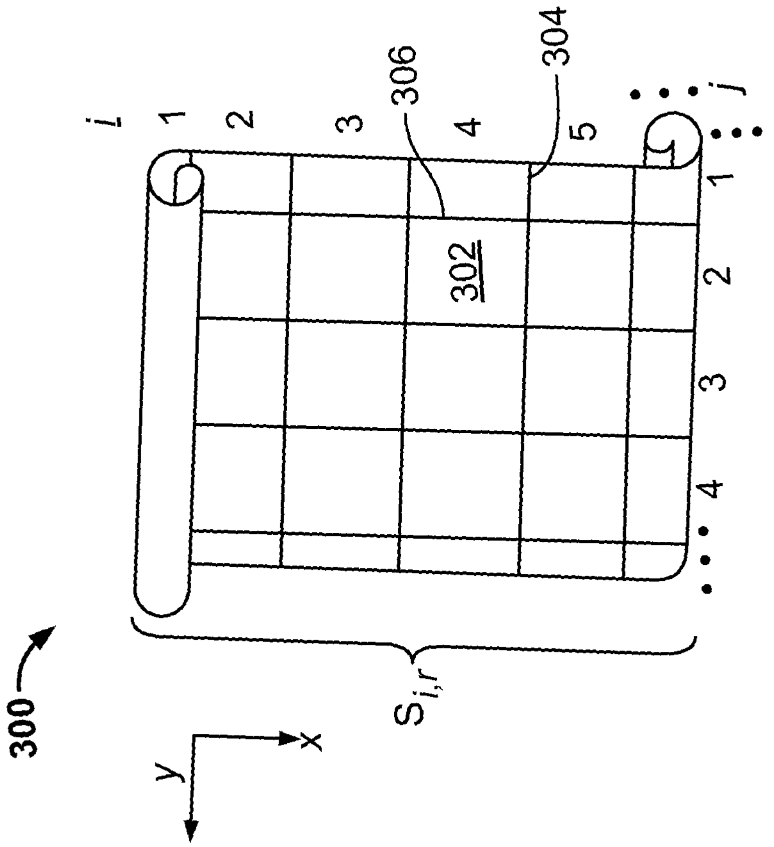
FIG. 3 shows schematically apparatus that may be used in accordance with the principles of the invention.

FIG. 3 shows schematically illustrative lamina 300. Lamina 300 may have one or more features in common with lamina 200.

Lamina 300 may include one or more segments such as segment 302. Segment 302 may be joined to one or more other segments at a separation line such as 304. Segment 302 may be joined to one or more other segments at a separation line such as 306. Two or more segments may be arranged along direction x. Two or more segments may be arranged along direction y. The segments may be identified as $S_{i,j}$, with i=1, 2, 3, 4, . . . , I, and j=1, 2, 3, 4, . . . , J. Segments $S_{i,j}$ at a fixed value of j may be referred to as a column. Segments $S_{i,j}$ at a fixed value of i may be referred to as a row.

The terms "column" and "row" may refer to segments that are arranged in a rectilinear pattern. The terms "column" and "row" may refer to segments that are arranged in a pattern that is not a rectilinear pattern.

A segment may support an LED. A segment may support a group of LEDs. A segment may support an integrated circuit.

The integrated circuit may be in electrical communication with LEDs on one or more segments via conductors. A conductor may cross a separation line. A user may separate segments along a separation line.

Lamina 300 may have a two-dimensional (sheet, extending in x-y space) layout of segments.

LED elements may include LEDs of different colors. The elements may include LEDs of different CCTs.

The elements may be controlled by a controller. The controller may be external to the lamina.

The controller may be adjustable by a user. The controller may be mechanically adjustable by a user.

The elements may include one or more integrated circuits.

The lamina may be a lamina that includes only one integrated circuit.

The integrated circuits may be those identified as a SM17511PS IC or DMX512AWIC.

The integrated circuits for the tape may be those identified as a SM17511PS IC.

The integrated circuits for the sheet may be those identified as a DMX512AWIC.

The integrated circuits may be those available from Shenzhen Sunmoon Microelectronics Co., Ltd (www.chinaasic.com).

The controller may include three output channels. Each channel may have three terminals: a high voltage terminal, a data terminal, and a ground or reference voltage terminal.

One terminal may be a ground.

One terminal may be a high (24, 48 or the like) DC voltage (VDDi, which can be stepped down for i=1, 2, 3, 4, . . . input voltages on the integrated circuits).

One terminal may be a data conductor for transmitting control data.

The controller may be a DMX LED controller A2C10-3.

An IC may have a terminal corresponding to each of the three controller terminals of a channel. The IC may have terminals that connect to other ICs on the lamina. The IC may have terminals that connect to other ICs on other lamina. An IC that is connected to the controller may be configured to have, among other terminals, only three terminals that correspond to the three controller terminals of the channel of which the IC is a part.

In the tape, control data may be transmitted to a first IC, and then transferred to other ICs in cascading format. Thus, the data would pass first to IC1. IC1 would then process the data, and pass information to IC2, and so on to IC3, IC4, or one or more further ICs. The ICs may be arranged on one or more tapes.

In the sheet, each segment may include 2 ICs. Control data may be transmitted to a first IC on the segment, and then transferred to a second IC on the segment. Thus, the data would pass first to IC1. IC1 would then process the data, and pass information to IC2. The circuit may be arranged such that IC2 does not transfer data to another IC in the segment or in a different segment. ICs in other segments may receive control data directly from the controller.

Figure 4:
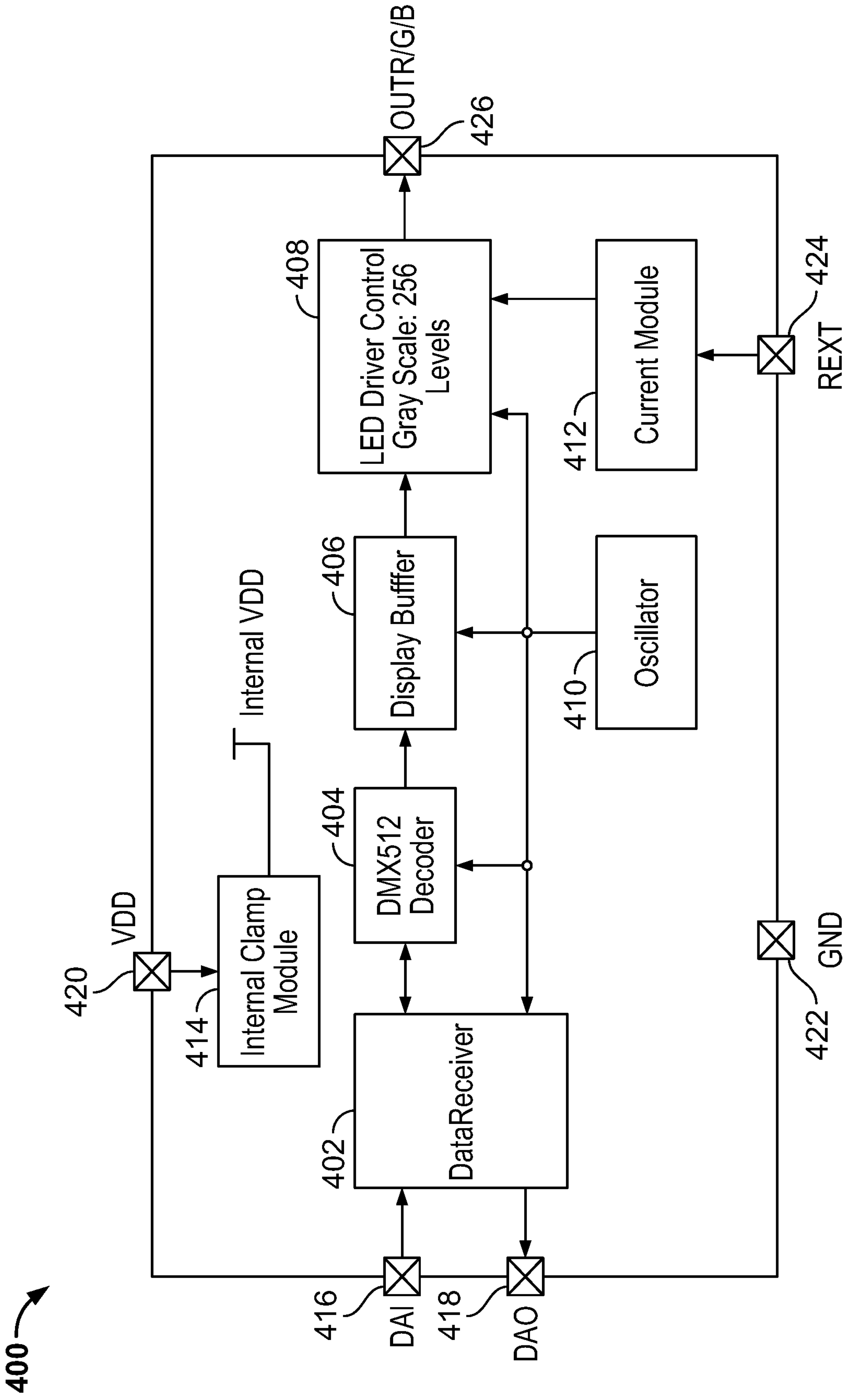
FIG. 4 shows schematically apparatus that may be used in accordance with the principles of the invention.

FIG. 4 shows schematically illustrative IC 400. IC 400 may include an IC such as SM17511PS IC. IC 400 may include data receiver 402. IC 400 may include DMX512 decoder 404. IC 400 may include display buffer 406. IC 400 may include LED driver control 408. IC 400 may include oscillator 410. IC 400 may include current module 412. IC 400 may include internal claim module 414.

IC 400 may include DAI terminal 416. IC 400 may include DAO terminal 418. IC 400 may include VDD terminal 420. IC 400 may include GND terminal 422. IC 400 may include REXT terminal 424. IC 400 may include OUTR/G/B terminal 426.

IC 400 may receive incoming control data from a controller at DAI terminal 416. Data receiver 402 may preprocess the control data. Data receiver may remove noise or distortion from a signal received at DAI terminal 416. Data receiver 402 may provide pre-processed control data to DMX512 decoder 404. DMX512 decoder 404 may interpret the pre-processed control data based on a lighting format. DMX512 decoder 404 may determine a value for a field in a data packet that conforms to a lighting control data format. DMX512 decoder 404 may transmit light setting instructions to display buffer 406. A light setting instruction may set a current in a current regulator. Display buffer 406 may feed the instructions to LED driver control 408. LED driver control 408 may be in electrical communication with OUTR/G/B terminal 426. OUTR/G/B terminal 426 may provide to LED driver control 408 a lighting current from a lighting circuit branch. The lighting current may be driven by an external voltage. The external voltage may be supplied by a controller such as controller 104. The external voltage may be at a higher potential than is OUTR/G/B terminal 426. The external voltage may be 5, 10, 12, 24, 48 VDC or any other suitable voltage.

LED driver control 408 may limit the current in conformance with a light setting instruction. LED driver control 408 may include one or more current regulators. LED driver control 408 may include a current regulator for each lighting branch that is coupled to OUTR/G/B terminal 426. Current flowing through an LED in line with the external voltage and REXT terminal 424 may thus be limited to achieve a light output at the LED that corresponds to the light setting instruction.

LED driver control 408 may pass the current through current module 412 to REXT terminal 424.

A maximum output current through REXT terminal 424 may be set using a 4 bit register in REXT terminal 424. A maximum output current through REXT terminal 424 may be obtained by providing a resistance in line with REXT terminal 424. OUTR/G/B terminal 426 may include multiple terminals. Each of the terminals may be coupled to a lighting branch. Each branch may include one or more LEDs. The LEDs of a branch may be of a single output color. The LEDs of a branch may be of different output colors. The multiple terminals may include a terminal for a red LED branch. The multiple terminals may include a terminal for a green LED branch. The multiple terminals may include a terminal for a blue LED branch. Current module 412 may include a current regulator for each of the terminals. LED driver control 408 may separate control the current level for each of the terminals.

Oscillator 410 may be in communication with data receiver 402. Oscillator 410 may be in communication with DMX512 decoder 404. Oscillator 410 may be in communication with display buffer 406. Oscillator 410 may be in communication with LED driver control 408. Oscillator 410 may provide a timing signal to those components or other components of IC 400.

Internal clamp module 414 may be coupled to VDD terminal 420. Internal clamp module 414 may provide an onboard power source for the components of IC 400.

DAO terminal 418 may provide outgoing control data. The outgoing control data may be derived from the incoming control data. The outgoing control data may include the same information as is included in the incoming control data. The outgoing control data may be derived from DMX512 decoder 404. The outgoing control data may be derived from display buffer 406. The outgoing control data may be derived from LED driver control 408.

IC 400 may attach an address to a sample of lighting control data. The address may include a pointer to a field in the sample. IC 400 may output the pointer along with the sample via DAO terminal 418 to another IC (not shown). The other IC may have one or more features in common with IC 400. The other IC may be mounted on the same segment on which IC 400 is mounted. The other IC may be mounted on a segment that is different from the segment on which IC 400 is mounted. The other IC may receive via a DAI terminal the sample and the pointer. The other IC may implement a lighting control instruction at a current regulator that corresponds to the pointer.

GND terminal 422 may be tied to a ground (not shown) of the controller (not shown).

IC 400 may be coupled to the controller via only DAI terminal 416, VDD terminal 420 and GND terminal 422.

Figure 5:
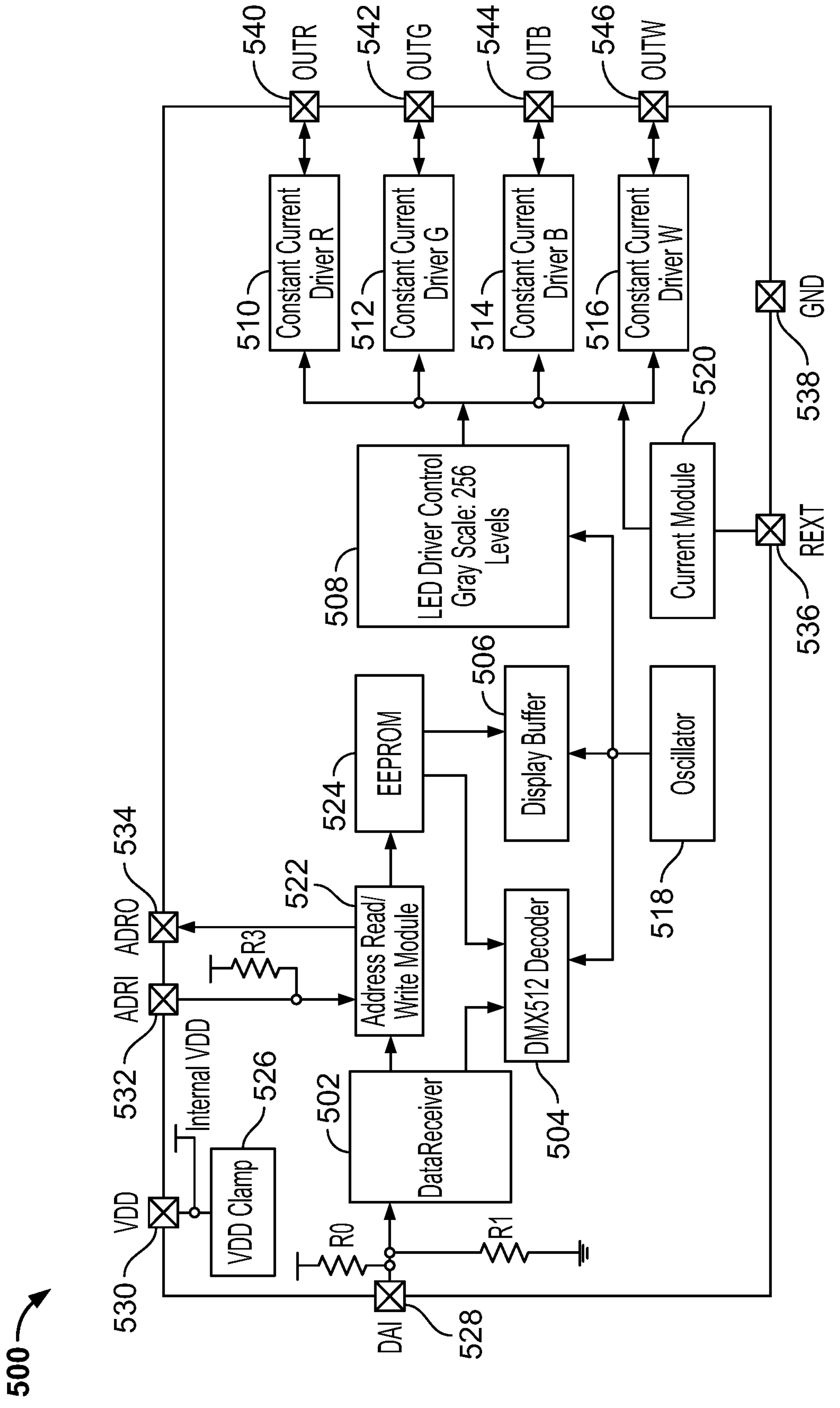
FIG. 5 shows schematically apparatus that may be used in accordance with the principles of the invention.

FIG. 5 shows schematically illustrative IC 500. IC 500 may include an IC such as DMX512AWIC. IC 500 may include data receiver 502. IC 500 may include DMX512 decoder 504. IC 500 may include display buffer 506. IC 500 may include LED driver control 508. IC 500 may include constant current driver R 510. IC 500 may include constant current driver G 512. IC 500 may include constant current driver B 514. IC 500 may include constant current driver W 516. IC 500 may include oscillator 518. IC 500 may include current module 520. IC 500 may include address read/write module 522. IC 500 may include EEPROM 524. IC 500 may include VDD clamp 526.

IC 500 may include DAI terminal 528. IC 500 may include VDD terminal 530. IC 500 may include ADRI terminal 532. IC 500 may include ADRO terminal 534. IC 500 may include REXT terminal 536. IC 500 may include GND terminal 538. IC 500 may include OUTR terminal 540. IC 500 may include OUTG terminal 542. IC 500 may include OUTB terminal 544. IC 500 may include OUTW terminal 546.

IC 500 may receive incoming control data from a controller at DAI terminal 528. Data receiver 502 may receive the control data. Data receiver 502 may provide pre-processed control data to DMX512 decoder 504. Data receiver 502 may have one or more features in common with data receiver 402. DMX512 decoder 404 may interpret the pre-processed control data based on a lighting format. DMX512 decoder 504 may have one or more features in common with DMX512 decoder 404. DMX512 decoder 504 may transmit the light setting instructions to display buffer 506. Display buffer 506 may feed the instructions to LED driver control 508. LED driver control 508 may be coupled to one or more of OUTR terminal 540, OUTG terminal 542, OUTB terminal 544 and OUTW terminal 546.

One or more of OUTR terminal 540, OUTG terminal 542, OUTB terminal 544 and OUTW terminal 546 may receive a lighting current from a lighting circuit branch. The lighting current may be driven by an external voltage. The external voltage may be supplied by a controller such as controller 104. The external voltage may be at a higher potential than that of OUTR terminal 540, OUTG terminal 542, OUTB terminal 544 and OUTW terminal 546. The external voltage may be 5, 10, 12, 24, 48 VDC or any other suitable voltage. LED driver control 508 may set maximum current levels for one or more of constant current driver R 510, constant current driver G 512, constant current driver B 514 and constant current driver W 516.

Current module 520 may receive current from one or more of constant current driver R 510, constant current driver G 512, constant current driver B 514 and constant current driver W 516. Current module 520 may discharge the current through REXT terminal 536. REXT terminal 536 may be in electrical communication with resistance external to IC 500. The resistance may discharge the current away from IC 500.

Oscillator 518 may be in communication with DMX512 decoder 504. Oscillator 518 may be in communication with display buffer 506. Oscillator 518 may be in communication with LED driver control 508. Oscillator 518 may provide a timing signal to those components or other components of IC 500.

VDD clamp 526 may be coupled to VDD terminal 530. VDD clamp 526 may provide an onboard power source for the components of IC 500.

GND terminal 538 may be tied to a ground (not shown) of the controller (not shown).

EEPROM 524 may provide an address to address read/write module 522. The address may correspond to another IC (not shown). The address may include a pointer to a field in a lighting control data sample. The other IC may have one or more features in common with IC 500. The other IC may be mounted on segment 302. The other IC may be mounted on a segment that is different from segment 302.

Address read/write module 522 may receive a sample of lighting control data from data receiver 502. Address read/write module 522 may associate the pointer with the sample. Address read/write module 522 may output the sample and the pointer via ADRO terminal 534. An IC receiving the sample and the pointer data via an ADRI terminal may implement a lighting control instruction at a current regulator that corresponds to the pointer.

IC 500 may formulate light setting instructions, as discussed above, based on the pre-processed control data.

IC 500 may be coupled to the controller via only DAI terminal 528, VDD terminal 530 and GND terminal 538.

Figure 6:
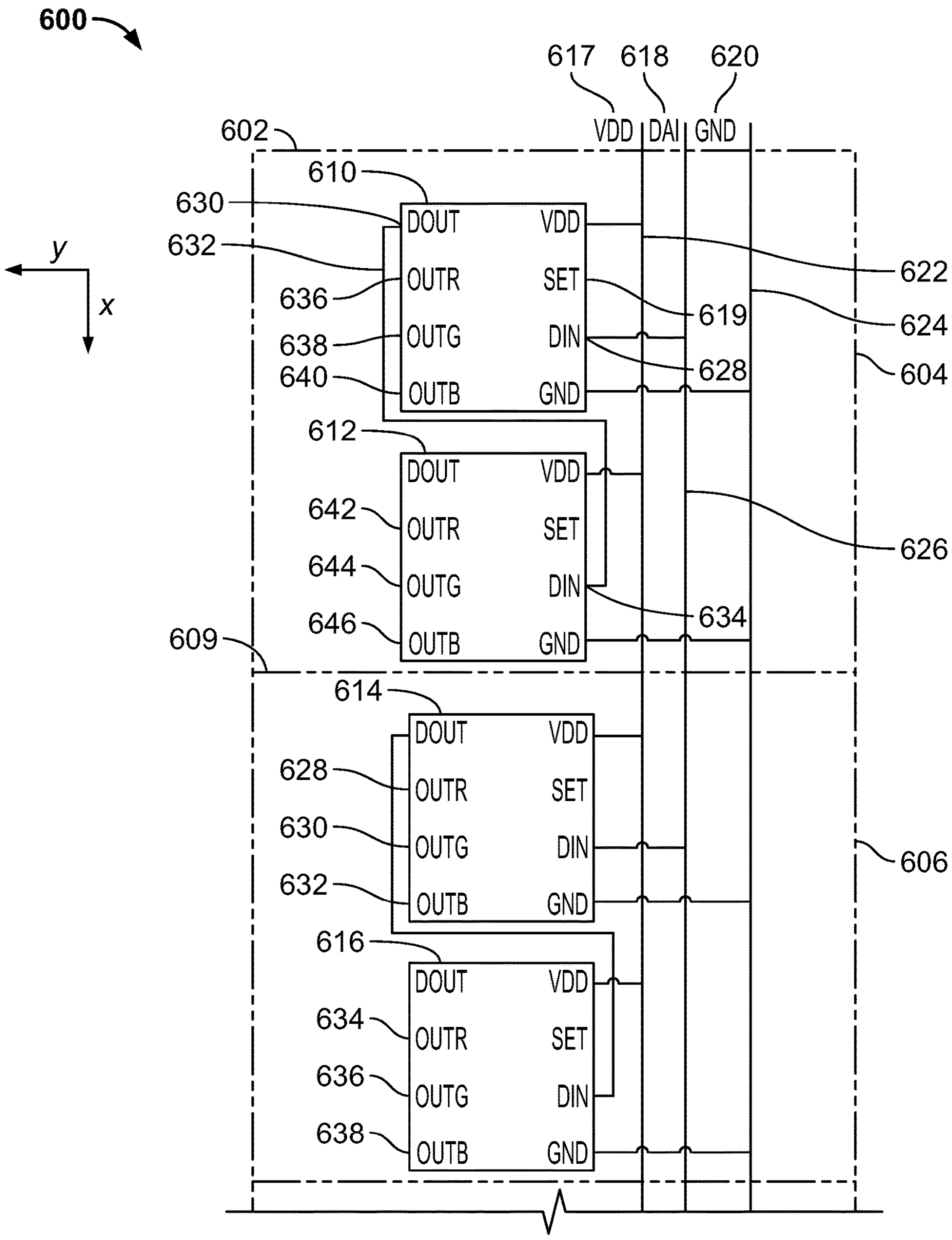
FIG. 6 shows schematically apparatus in accordance with the principles of the invention.

FIG. 6 shows illustrative light tape 600. Light tape 600 may include lamina 602. Lamina 602 may have one or more features in common with lamina 200. Light tape 600 may include segment 604. Light tape 600 may include segment 606. Light tape 600 may include other segments (not shown). Segment 606 and other segments may extend away from segment 604 in direction x. The segments may be joined at separation line 609. Separation line 609 may have one or more features in common with separation line 204.

Light tape 600 may include IC 610. Light tape 600 may include IC 612. Light tape 600 may include IC 614. Light tape 600 may include IC 616. One or more of ICs 610, 612, 614 and 616, and any other ICS in light tape 600, may have one or more feature in common with IC 400. A segment of light tape 600 may include 2, 3, 4 or more such ICs.

Light tape 600 may include VDD terminal 617. Light tape 600 may include DAI terminal 618. Light tape 600 may include GND terminal 620. Light tape may include an electrical connector (not shown). The connector may include terminals 617, 618 and 620. The connector may be compatible with a DMX style connector. Terminal 617 may receive a voltage for powering the ICs on light tape 600. Terminal 618 may receive a control data signal for controlling LEDs on light tape 600. Terminal 620 may receive a common reference voltage or a ground from the controller. Light tape 600 may be a tape that does not receive such inputs from a second controller.

Conductor 622 may provide IC power to VDD terminals of one or more of ICs 610, 612, 614 and 616, and any other ICs on tape 600. Conductor 624 may provide a controller ground-voltage level to GND terminals of one or more of ICs 610, 612, 614 and 616, and any other ICs on tape 600.

Conductor 626 may provide control data to the ICs in each segment of tape 600. For example, conductor 626 may be coupled directly to DIN terminal 628 of IC 614. IC 610 may output the control data via DOUT terminal 630. Jumper 632 may transmit the control data from DOUT terminal 630 to DIN terminal 634 of IC 612. The control data may include encoded light setting instructions for one or more of OUTR terminal 636, OUTG terminal 638, OUTB terminal 640, OUTR terminal 642, OUTG terminal 644, and OUTB terminal 646.

Jumper 632 may transmit a control data address such as pointer 150 from DOUT terminal 630 to DIN terminal 634 of IC 612. Control data transmitted from terminal 630 may thus trigger encoded light setting instructions for one or more of OUTR terminal 642, OUTG terminal 644, and OUTB terminal 646.

Thus, a three-conductor connector, from a controller, connected to VDD terminal 617, DAI terminal 618 and GND terminal 620 may control 1, 2, 3, 4, 5, 6 . . . LED lighting circuit branches on segment 604.

ICs 614 and 616 on segment 606 may be connected to each other in a manner similar to that in which ICs 610 and 612 on segment 604 are connected. SET terminals such as 619 may provide current discharge to ground.

Figure 7:
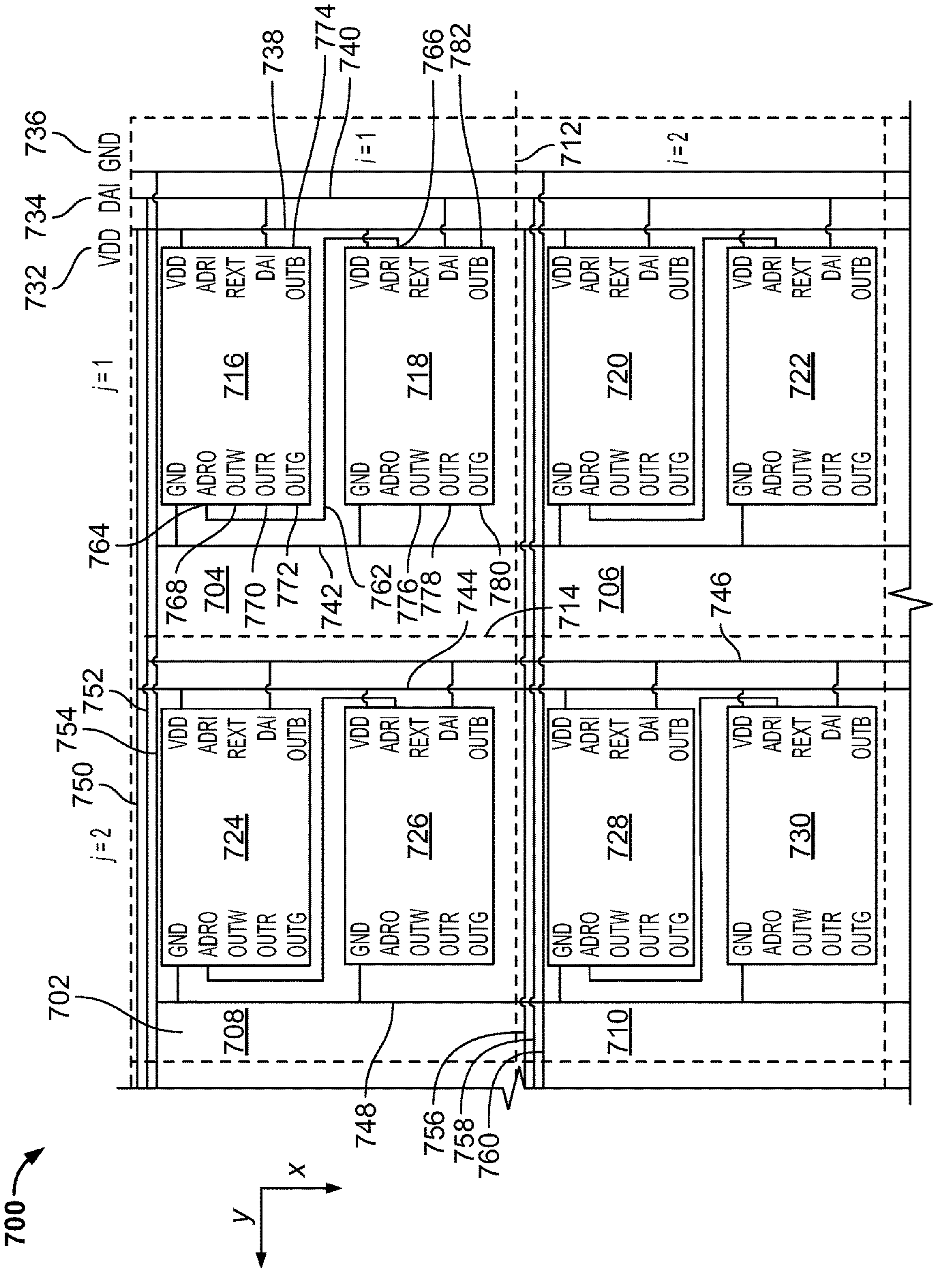
FIG. 7 shows schematically apparatus in accordance with the principles of the invention.

FIG. 7 shows illustrative light sheet 700. Light sheet 700 may include lamina 702. Lamina 702 may have one or more features in common with lamina 300. Light sheet 700 may include segment 704. Light sheet 700 may include segment 706. Light sheet 700 may include segment 708. Light sheet 700 may include segment 710. Light sheet 700 may include other segments (not shown).

Segments 706 and 710, and other segments, may be disposed, relative to segment 704 and 708, in direction x. The segments may be joined at separation lines such as 712. Separation line 712 may have one or more features in common with separation line 304.

Segments 708 and 710, and other segments, may be disposed, relative to segments 704 and 706, in direction y. The segments may be joined at a separation line such as 714. Separation line 714 may have one or more features in common with separation line 306.

Light sheet 700 may include IC 716. Light sheet 700 may include IC 718. Light sheet 700 may include IC 720. Light sheet 700 may include IC 722. Light sheet 700 may include IC 724. Light sheet 700 may include IC 726. Light sheet 700 may include IC 728. Light sheet 700 may include IC 730.

One or more of ICs 716, 718, 720, 722, 724, 726, 728 and 730 and any other ICs of light sheet 700, may have one or more feature in common with IC 500. A segment of light sheet 700 may include 2, 3, 4 or more such ICs.

Light sheet 700 may include VDD terminal 732. Light sheet 700 may include DAI terminal 734. Light sheet 700 may include GND terminal 736. Light sheet 700 may include an electrical connector (not shown). The connector may include terminals 732, 734 and 736. Any one or more of the segments of light sheet 700 may include such a connector. The connector may be compatible with a DMX style connector. VDD terminal 732 may receive a voltage for powering the ICs on light sheet 700. DAI terminal 734 may receive a control data signal for controlling LEDs on light sheet 700. GND terminal 736 may receive a common reference voltage or a ground from the controller. Light sheet 700 may be a sheet that does not receive such inputs from a second controller.

Conductor 738 may provide IC power to VDD terminals of IC 716 and ICs in segments disposed along direction x in column 1 of sheet 700. Conductor 740 may provide control data to DAI terminals of IC 716 and ICs in segments disposed along direction x in column 1 of sheet 700. Conductor 742 may provide a controller ground-voltage level to GND terminals of IC 716 and ICs in segments disposed along direction x in column 1 of sheet 700.

Conductor 744 may provide IC power to VDD terminals of IC 716 and ICs in segments disposed along direction x in column 2 of sheet 700. Conductor 746 may provide control data to DAI terminals of IC 716 and ICs in segments disposed along direction x in column 2 of sheet 700. Conductor 748 may provide a controller ground-voltage level to GND terminals of IC 716 and ICs in segments disposed along direction x in column 2 of sheet 700.

Conductor 750 may provide IC power to VDD terminals of ICs in columns j=2 . . . J that are disposed in direction y relative to column 1. Conductor 752 may provide control data to DAI terminals of ICs in columns j=2 . . . J that are disposed in direction y relative to column 1. Conductor 754 may provide a controller ground-voltage level to ICs in columns j=2 . . . J that are disposed in direction y relative to column 1.

Conductor 756 may provide IC power to VDD terminals of ICs in rows i=2 . . . I that are disposed in direction x relative to row 1. Conductor 758 may provide control data to DAI terminals of ICs in rows i=i . . . I that are disposed in direction x relative to row 1. Conductor 760 may provide a controller ground-voltage level to ICs in rows i=2 . . . I that are disposed in x relative to row 1.

In segment $S_{1,1}$, jumper 762 may transmit a control data address such as pointer 150 from ADRO terminal 764 of IC 716 to ADRI terminal 766 of IC 718. Control data transmitted from terminal 734 may thus trigger encoded light setting instructions for one or more of OUTW terminal 768, OUTR terminal 770, OUTG terminal 772, and OUTB terminal 774 of IC 716, and one or more of OUTW terminal 776, OUTR terminal 778, OUTG terminal 780, and OUTB terminal 782, of IC 718. One or more other $S_{i,j}$ segments in sheet 700 may include the same or a similar arrangement.

One or more segments other than segment 704 may include one or more terminals such as terminal 732, terminal 734 and terminal 736. Such terminals may be included in a connector.

Other segments in sheet $S_{i,j}$ may include conductor layouts analogous to those of one or more of segments 704, 706, 708 and 710. Other segments in sheet $S_{i,j}$ may include IC layouts analogous to those of one or more of segments 704, 706, 708 and 710. Thus, a user may separate segments along separation lines in directions x, y, or x and y, and retain functionality of the ICs and LEDs on separated segment or segments.

Thus a three-conductor connector, from a controller, connected to VDD terminal 732, DAI terminal 734 and GND terminal 736 may control 1, 2, 3, 4, 5, 6 . . . LED lighting circuit branches on a segment such as $S_{i,j}$.

Figure 8:
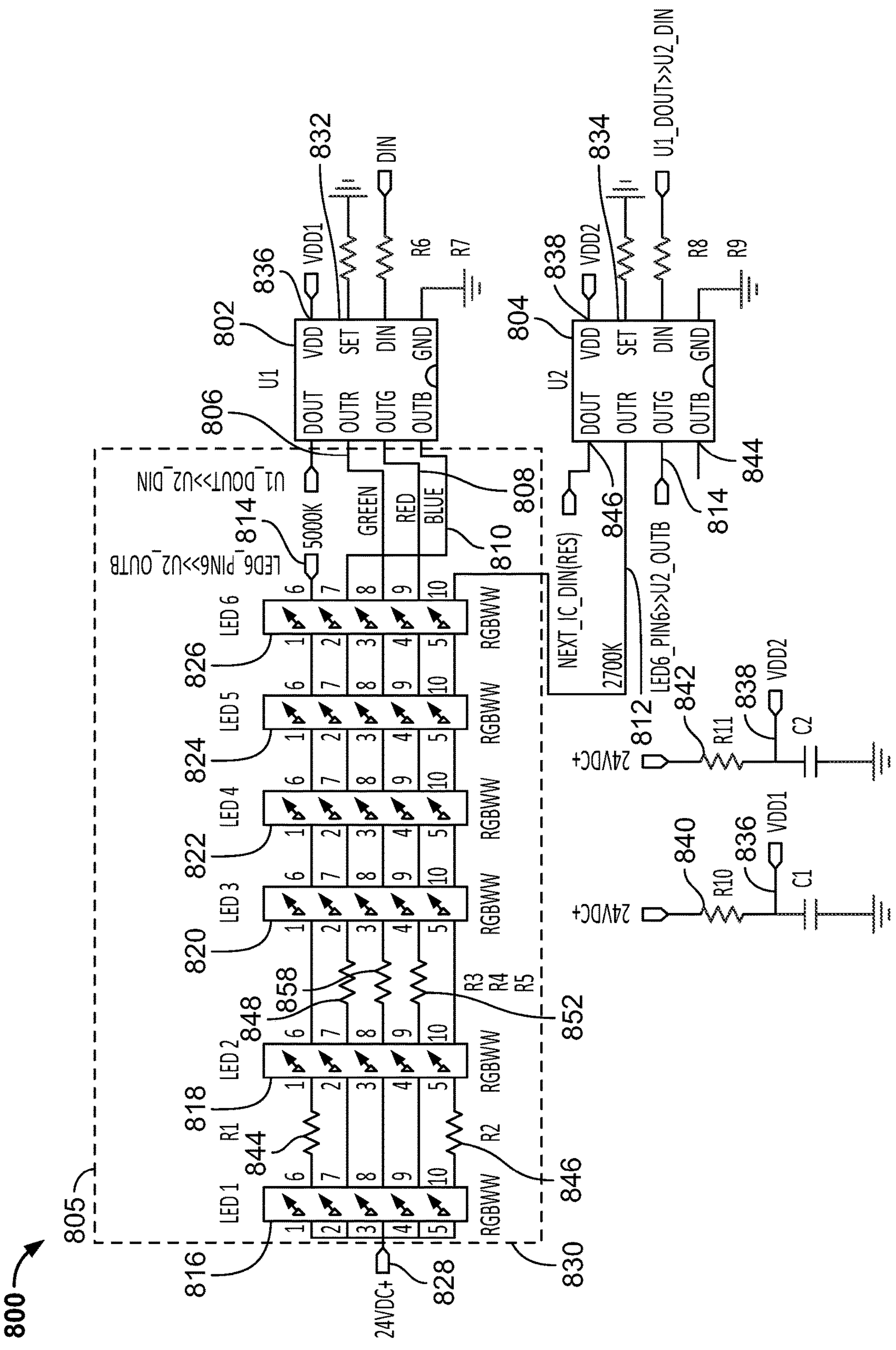
FIG. 8 shows schematically apparatus in accordance with the principles of the invention.

FIG. 8 shows schematically illustrative circuit 800. Circuit 800 may be arranged on a lamina such as lamina 200. Circuit 800 may include IC 802. Circuit 800 may include IC 804. Circuit 800 may include array 805 of lighting branches.

IC 802, IC 804 and array 805 may be mounted on a single segment $T_i$. Array 805 may be disposed on the lamina over more than one segment $T_i$.

Array 805 may include lighting branch 806. Array 805 may include lighting branch 808. Array 805 may include lighting branch 810. Array 805 may include lighting branch 812. Array 805 may include lighting branch 814.

One or both of ICs 802 and 804 may have one or more features in common with IC 400. ICs 802 and 804 may be configured to be in electrical communication with a lighting controller in a manner that is the same or similar to that shown in connection with tape 600. ICs 802 and 804 may be configured to be in electrical communication with each other in a manner that is the same or similar to that shown in connection with tape 600. ICs 802 and 804 may be configured to be in electrical communication with ICs on different segments of the same tape in a manner that is the same or similar to that shown in connection with tape 600.

One or more of lighting branches 806, 808, 810, 812 and 814 may include one or more LEDs. The LEDs of a lighting branch may emit light of a color that is different from the colors of the LEDs on other branches. The LEDs of a lighting branch may emit light of the same or similar color.

The LEDs of a branch may belong to one or more groups. Circuit 800 may include group 816. Circuit 800 may include group 818. Circuit 800 may include group 820. Circuit 800 may include group 822. Circuit 800 may include group 824. Circuit 800 may include group 826. One or more of the groups may include one or more of a red-emitting LED, a green-emitting LED, a blue-emitting LED, a first white-emitting LED, a second white-emitting LED, and any other suitable LED. LEDs of the same color in the different groups may be arranged on a lighting branch designated for that color.

A first white-emitting LED may emit white light with a first CCT. A second white-emitting LED may emit white light with a second CCT. The second CCT may be different from the first CCT. One or more of the CCTs may be 1800° K or any other suitable CCT. One or more of the CCTs may be 2700° K or any other suitable CCT. One or more of the CCTs may be 5000° K or any other suitable CCT.

Circuit 800 may include lighting voltage terminal 828. Lighting voltage terminal 828 may be used to supply current at end 830 of array 805. The current may cause the LEDs in the lighting branches to emit. ICs 802 and 804 may regulate the current in a branch in accordance with a light setting instruction corresponding to the branch. The current may be discharged through SET terminals 832 and 834.

Voltage terminal 828 may be part of a connector (not shown) that is configured to couple voltage 828 to a lighting voltage. The voltage may be 5 VDC, 12 VDC, 24 VDC, 48 VDC, or any other suitable voltage.

Branches in array 805 may include one or more in-line resistances such as 844 and 846 (R1 and R2, respectively) in branches 814 and 812, respectively. Branches in array 805 may include one or more in-line resistances such as 848, 850 and 852 (R3, R4 and R5, respectively) in branches 810, 806 and 808, respectively. An in-line resistance may provide a voltage drop in the branches to make the branch voltages at the IC terminals suitable for regulation by the corresponding current regulator in an IC.

A resistance may include one or more resistors or other resistance elements.

IC operational voltages 836 and 838 (VDD1 and VDD2) may be fixed with respect to the lighting voltage by resistances 840 and 842 (R10 and R11, respectively). One or more of the terminals, such as OUTB terminal 844, may be unused. DOUT terminal 846 may provide control data to an IC on a different segment (not shown).

A lighting branch may be coupled to an IC current regulation terminal based on matching of a predetermined order of the colors of the branches in an array with a sequence of light level values $L_n$ for a sample. (For example, the green and blue branches are reversed with respect to labeling of terminals of IC. 802, and a 2700° K CCT white branch is coupled to a terminal labeled "OUTR".)

Figure 9:
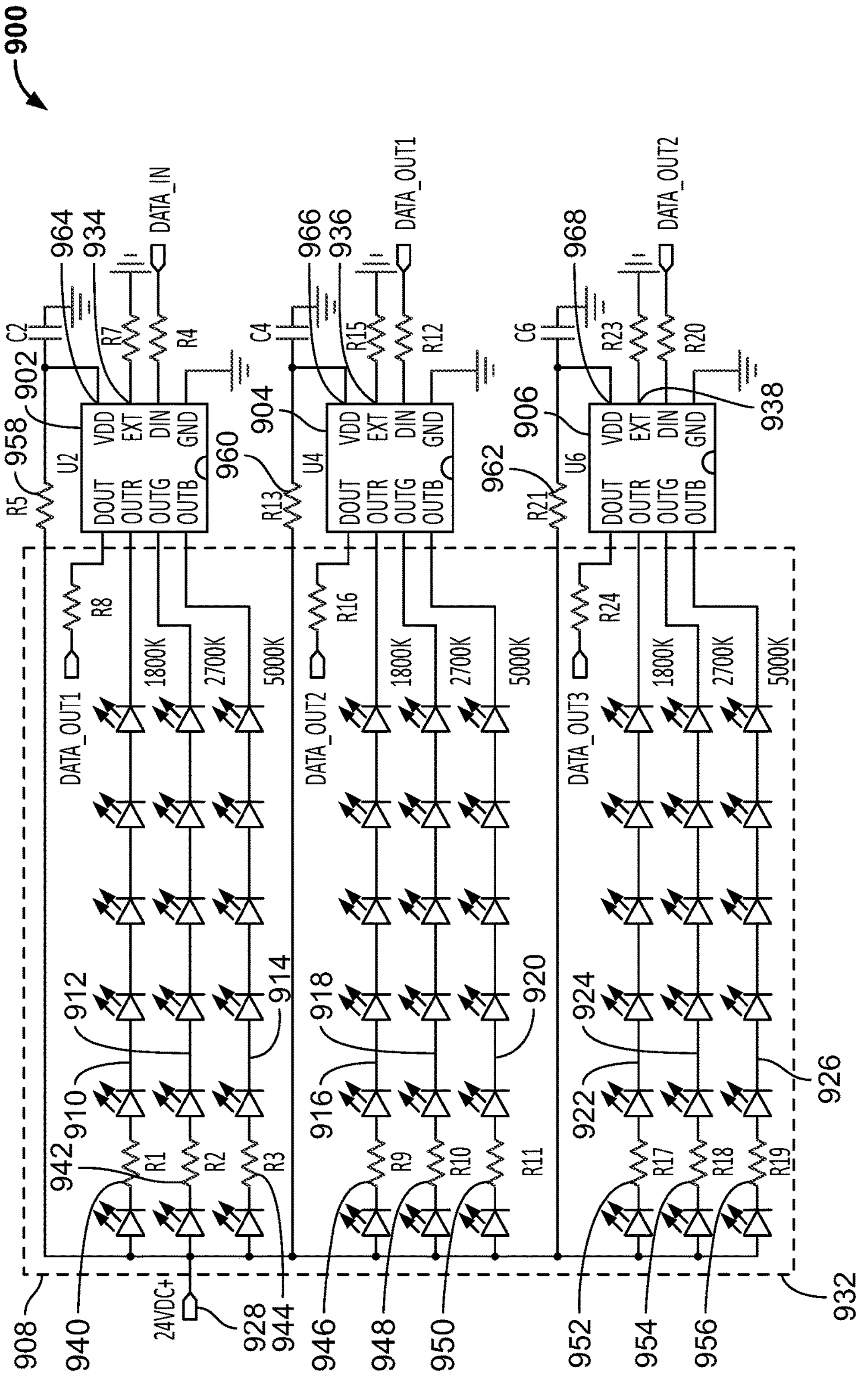
FIG. 9 shows schematically apparatus in accordance with the principles of the invention.

FIG. 9 shows schematically illustrative circuit 900. Circuit 900 may be arranged on a lamina such as lamina 200. Circuit 900 may include IC 902. Circuit 900 may include IC 904. Circuit 900 may include IC 906. Circuit 900 may include array 908 of lighting branches.

IC 902, IC 904, IC 906 and array 908 may be mounted on a single segment $T_i$. Array 908 may be disposed on the lamina over more than one segment $T_i$.

Array 908 may include one or more lighting branches such as 910, 912, 914, 916, 918, 920, 922, 924, and 926.

One or more of ICs 902, 904 and 906 may have one or more features in common with IC 400. ICs 902, 904 and 906 may be configured to be in electrical communication with a lighting controller in a manner that is the same or similar to that shown in connection with tape 600. ICs 902, 904 and 906 may be configured to be in electrical communication with each other in a manner that is the same or similar to that shown in connection with tape 600. ICs 902, 904 and 906 may be configured to be in electrical communication with ICs on different segments of the same tape in a manner that is the same or similar to that shown in connection with tape 600.

One or more of lighting branches 910, 912, 914, 916, 918, 920, 922, 924, and 926 may include one or more LEDs. The LEDs of a lighting branch may emit light of a color that is different from the colors of the LEDs on other branches. The LEDs of a lighting branch may emit light of the same or similar color.

One or more of branches 910, 912, 914, 916, 918, 920, 922, 924, and 926 may include a first white-emitting LED. One or more of branches 910, 912, 914, 916, 918, 920, 922, 924, and 926 may include a first white-emitting LED. One or more of branches 910, 912, 914, 916, 918, 920, 922, 924, and 926 may include a second white-emitting LED. One or more of branches 910, 912, 914, 916, 918, 920, 922, 924, and 926 may include a third white-emitting LED.

LEDs of the same color temperature may be arranged on a lighting branch designated for that color temperature.

A first white-emitting LED may emit white light with a first CCT. A second white-emitting LED may emit white light with a second CCT. A third white-emitting LED may emit white light with a second CCT. The first, second and third CCTs may be different from one or both of the others. One or more of the CCTs may be 1800° K or any other suitable CCT. One or more of the CCTs may be 2700° K or any other suitable CCT. One or more of the CCTs may be 5000° K or any other suitable CCT.

An 1800° K branch may be coupled to an OUTR terminal. A 2700° K branch may be coupled to an OUTG terminal. A 5000° K branch may be coupled to an OUTB terminal.

Circuit 900 may include lighting voltage terminal 928. Lighting voltage terminal 928 may be used to supply current at end 932 of array 908. The current may cause the LEDs in the lighting branches to emit. ICs 902, 904 and 906 may regulate the current in a branch in accordance with a light setting instruction corresponding to the branch. The current may be discharged through EXT terminals 934, 936 and 938.

Lighting voltage terminal 928 may be part of a connector (not shown) that is configured to couple lighting voltage terminal 928 to a lighting voltage. The lighting voltage may be 5 VDC, 12 VDC, 24 VDC, 48 VDC, or any other suitable voltage.

Branches in array 908 may include one or more in-line resistances such as resistances 940, 942, 944, 946, 948, 950, 952, 954, and 956 (R1, R2, R3, R9, R10, R11, R17, R18 and R19, respectively) in branches 910, 912, 914, 916, 918, 920, 922, 924, and 926, respectively.

Resistances 958 (R5), 960 (R13) and 962 (R21) may fix IC operational voltages 962, 964 and 968 (VDDs for each of ICs 902, 904 and 906), respectively, relative to the lighting voltage. One or more of the terminals may be unused. DOUT terminal 846 may provide control data to an IC on a different segment (not shown).

Figure 10:
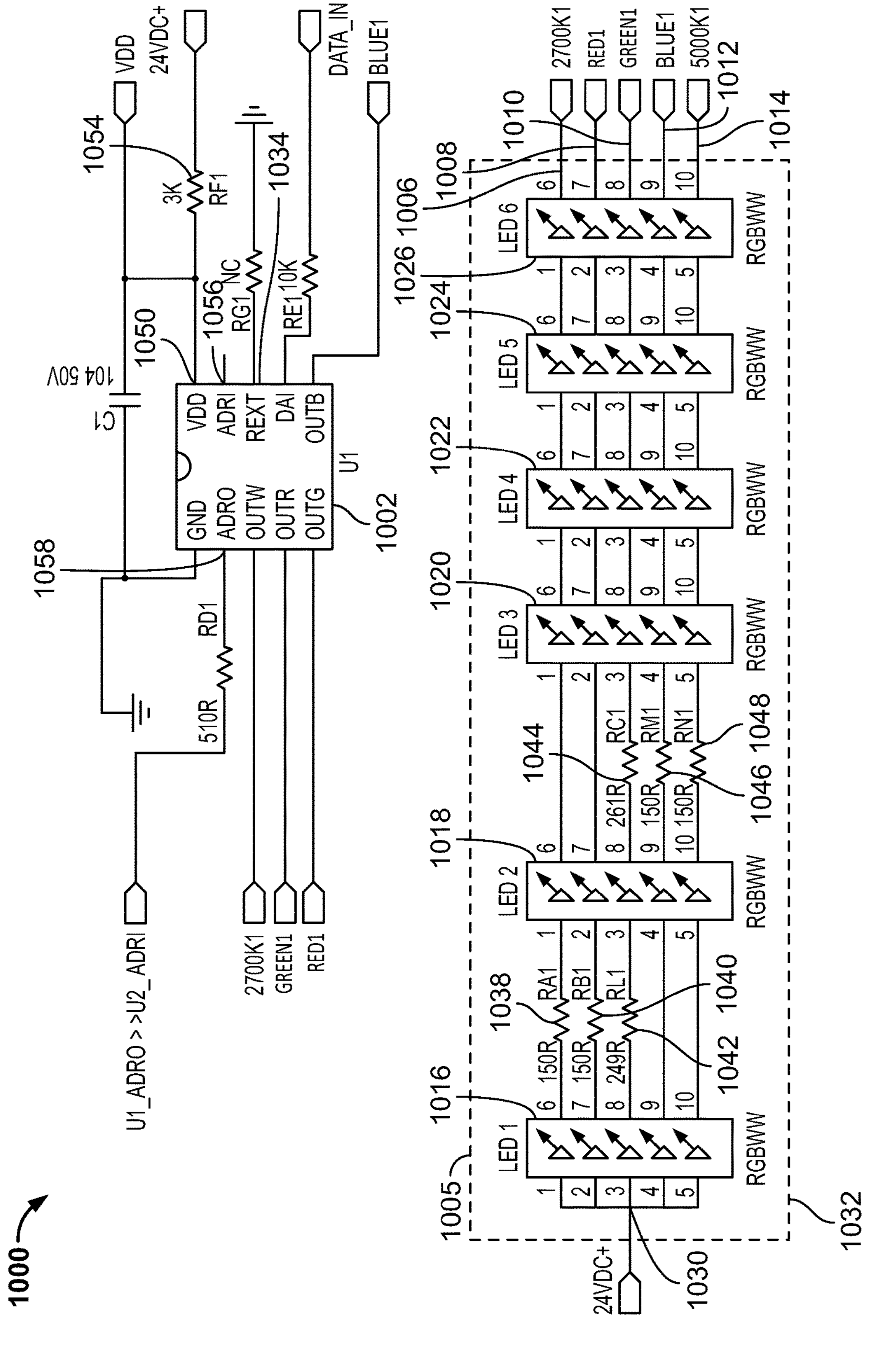
FIG. 10 shows schematically apparatus in accordance with the principles of the invention.
Figure 10:
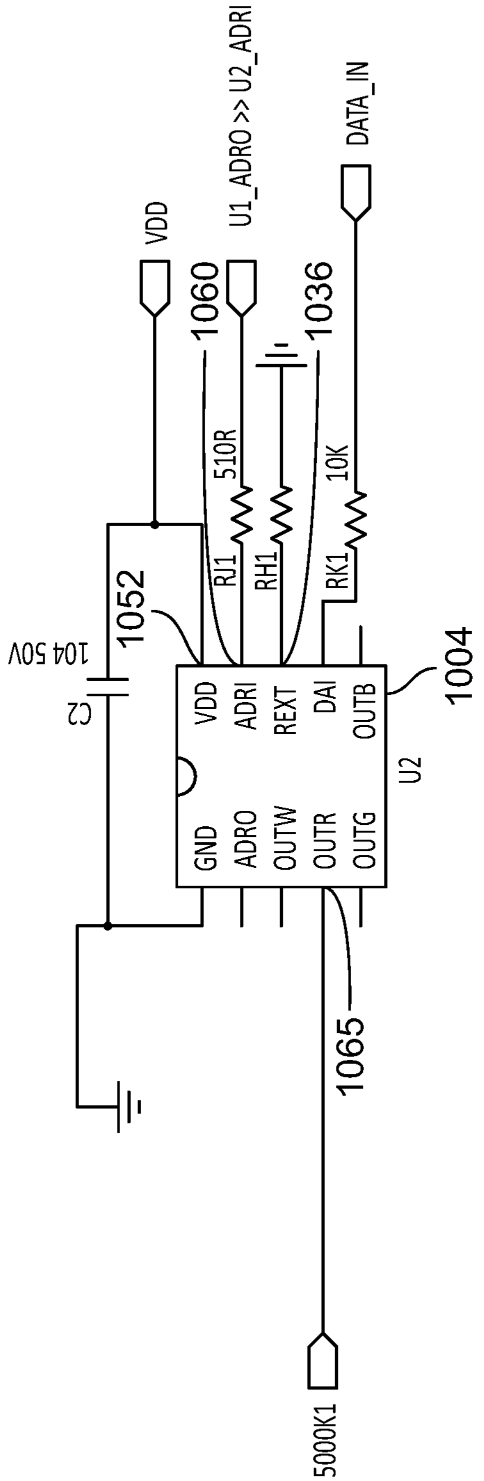

FIG. 10 shows schematically illustrative circuit 1000. Circuit 1000 may be arranged on a lamina such as lamina 300. Circuit 1000 may include IC 1002. Circuit 1000 may include IC 1004. Circuit 1000 may include array 1005 of lighting branches.

IC 1002, IC 1004 and array 1005 may be mounted on a single segment $S_{i,j}$. Array 1005 may be disposed on the lamina over more than one segment $S_{i,j}$.

Array 1005 may include lighting branch 1006. Array 1005 may include lighting branch 1008. Array 1005 may include lighting branch 1010. Array 1005 may include lighting branch 1012. Array 1005 may include lighting branch 1014.

One or both of ICs 1002 and 1004 may have one or more features in common with IC 500. ICs 1002 and 1004 may be configured to be in electrical communication with a lighting controller in a manner that is the same or similar to that shown in connection with light sheet 700. ICs 1002 and 1004 may be configured to be in electrical communication with each other in a manner that is the same or similar to that shown in connection with light sheet 700. ICs 1002 and 1004 may be configured to be in electrical communication with ICs on different segments of the same tape in a manner that is the same or similar to that shown in connection with sheet 700.

One or more of lighting branches 1006, 1008, 1010, 1012 and 1014 may include one or more LEDs. The LEDs of a lighting branch may emit light of a color that is different from the colors of the LEDs on other branches. The LEDs of a lighting branch may emit light of the same or similar color.

The LEDs of a branch may belong to one or more groups. Circuit 1000 may include group 1016. Circuit 1000 may include group 1018. Circuit 1000 may include group 1020. Circuit 1000 may include group 1022. Circuit 1000 may include group 1024. Circuit 1000 may include group 1026. One or more of the groups may include one or more of a red-emitting LED, a green-emitting LED, a blue-emitting LED, a first white-emitting LED, a second white-emitting LED, and any other suitable LED. LEDs of the same color in the different groups may be arranged on a lighting branch designated for that color.

A first white-emitting LED may emit white light with a first CCT. A second white-emitting LED may emit white light with a second CCT. The second CCT may be different from the first CCT. One or more of the CCTs may be 1800° K or any other suitable CCT. One or more of the CCTs may be 2700° K or any other suitable CCT. One or more of the CCTs may be 5000° K or any other suitable CCT.

Circuit 1000 may include lighting voltage terminal 1030. Lighting voltage terminal 1030 may be used to supply current at end 1032 of array 1005. The current may cause the LEDs in the lighting branches to emit. ICs 1002 and 1004 may regulate the current in a branch in accordance with a light setting instruction corresponding to the branch. The current may be discharged through REXT terminals 1034 and 1036.

Voltage terminal 1030 may be part of a connector (not show) that is configured to couple voltage 1030 to a lighting voltage. The voltage may be 5 VDC, 12 VDC, 24 VDC, 48 VDC, or any other suitable voltage.

Branches in array 1005 may include one or more in-line resistances such as 1038, 1040 and 1042 (RA1, RB1 and RL1, respectively) in branches 1006, 1008 and 1010, respectively. Branches in array 1005 may include one or more in-line resistances such as 1044, 1046 and 1048 (RC1, RM1 and RN1, respectively) in branches 1010, 1012 and 1014, respectively.

IC operational voltages 1050 and 1052 (of ICs 1002 and 1004, respectively) may be fixed with respect to the lighting voltage by resistance 1054 (RF1). ADRI terminal 1056 (of IC 1002) may be unused. ADRO terminal 1058 of IC 1002 may provide control data to ADRI terminal 1060 of IC 1004. One or more of the terminals of IC 1002 or 1004 may be unused.

Figure 11:
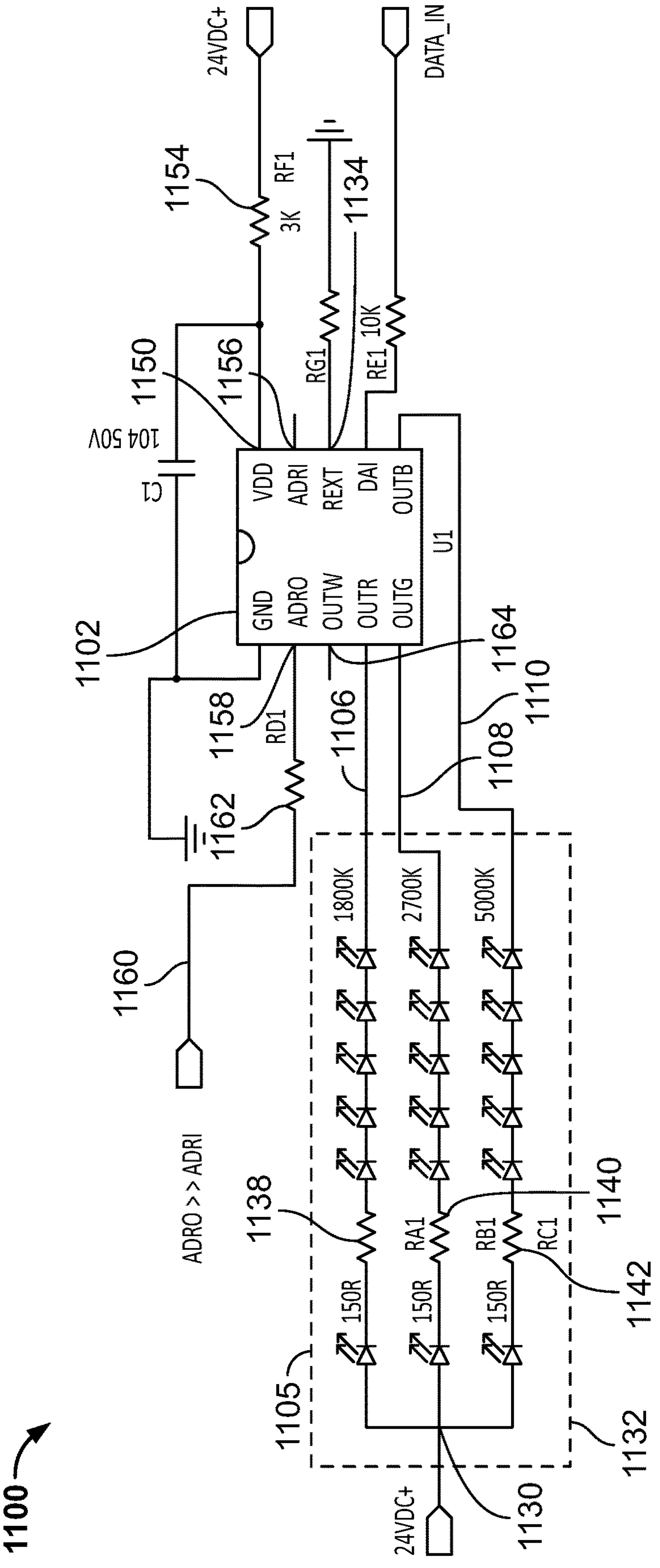
FIG. 11 shows schematically apparatus in accordance with the principles of the invention.

FIG. 11 shows schematically illustrative circuit 1100. Circuit 1100 may be arranged on a lamina such as lamina 300. Circuit 1100 may include IC 1102. Circuit 1100 may include array 1105 of lighting branches.

IC 1102 and array 1105 may be mounted on a single segment $S_{i,j}$. Array 1105 may be disposed on the lamina over more than one segment $S_{i,j}$.

Array 1105 may include lighting branch 1106. Array 1105 may include lighting branch 1108. Array 1105 may include lighting branch 1110.

IC 1102 may have one or more features in common with IC 500. IC 1102 may be configured to be in electrical communication with a lighting controller in a manner that is the same or similar to that shown in connection with sheet 700. IC 1102 may be configured to be in electrical communication with ICs on different segments of the same tape in a manner that is the same or similar to that shown in connection with sheet 700.

One or more of lighting branches 1106, 1108 and 1110 may include one or more LEDs. The LEDs of a lighting branch may emit light of a color that is different from the colors of the LEDs on other branches. The LEDs of a lighting branch may emit light of the same or similar color.

One or more of branches 1106, 1108 and 1110 may include a first white-emitting LED. One or more of branches 1106, 1108 and 1110 may include a second white-emitting LED. One or more of branches 1106, 1108 and 1110 may include a third white-emitting LED.

LEDs of the same color temperature may be arranged on a lighting branch designated for that color temperature.

A first white-emitting LED may emit white light with a first CCT. A second white-emitting LED may emit white light with a second CCT. A third white-emitting LED may emit white light with a second CCT. The first, second and third CCTs may be different from one or both of the others. One or more of the CCTs may be 1800° K or any other suitable CCT. One or more of the CCTs may be 2700° K or any other suitable CCT. One or more of the CCTs may be 5000° K or any other suitable CCT.

Circuit 1100 may include lighting voltage terminal 1130. Lighting voltage terminal 1130 may be used to supply current at end 1132 of array 1105. The current may cause the LEDs in the lighting branches to emit. IC 1102 may regulate the current in a branch in accordance with a light setting instruction corresponding to the branch. The current may be discharged through REXT terminal 1134.

Voltage terminal 1130 may be part of a connector (not show) that is configured to couple voltage 1130 to a lighting voltage. The voltage may be 5 VDC, 12 VDC, 24 VDC, 48 VDC, or any other suitable voltage.

Branches in array 1105 may include one or more in-line resistances such as 1138, 1140 and 1142 (RA1, RB1 and RC1, respectively) in branches 1106, 1108 and 1110, respectively.

IC operational voltage 1150 of IC 1102 may be fixed with respect to the lighting voltage by resistance 1154 (RF1). Jumper 1160 may run from ADRI terminal 1156 to ADRO terminal 1158. Jumper 1160 may include resistance 1162 (RD10). Jumper 1160 may ensure that a sample pointer is reset after lighting values are provided to lighting branches 1106, 1108 and 1110 in view of the non-use of OUTW terminal 1164.

One or more of the terminals of IC 1102 may be unused.

Figure 12:
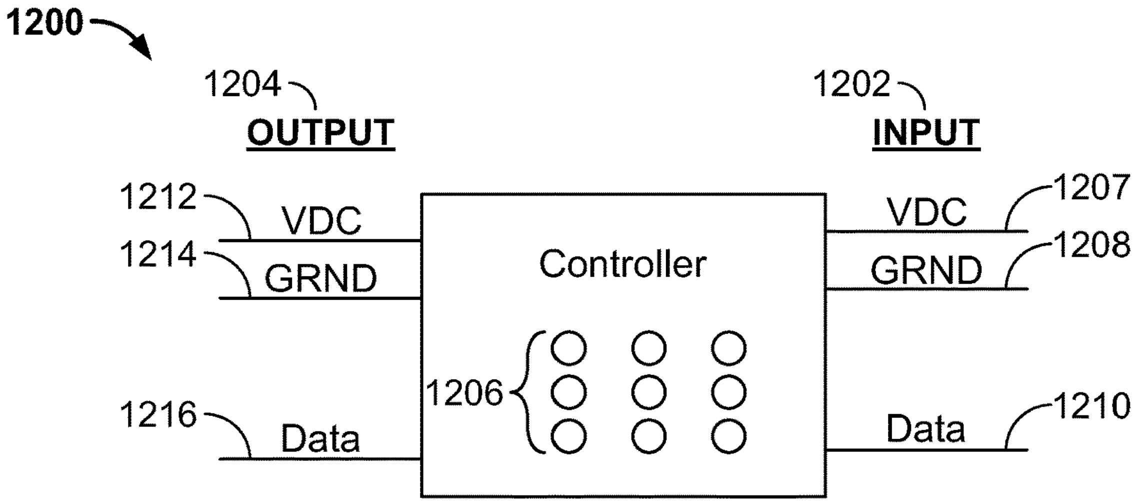
FIG. 12 shows schematically apparatus that may be used in accordance with the principles of the invention.

FIG. 12 shows schematically illustrative controller 1200. Controller 1200 may have one or more features in common with controller 104. Controller 1200 may be configured to receive inputs 1202. Controller 1200 may be configured to provide outputs 1204. Controller 1200 may include user-adjustable controls 1206. User-adjustable controls 1206 may have one or more features in common with selector 114.

Inputs 1202 may be compatible with a lighting format. Input VDC 1207 may provide operational voltage to controller 1200. Input VDC 1207 may provide lighting voltage to one or more lighting branches. Input GRND 1208 may provide a reference voltage or ground voltage. Input data 1210 may be generated by lighting control data generator such as 112.

Output VDC 1212 may provide operational voltage to an IC such as 400 or 500. Output VDC 1212 may provide operational voltage to one or more lighting branches. Output GRND 1214 may provide a reference voltage or ground voltage to an IC such as 400 or 500. Output Data 1216 may provide lighting control data to an IC such as 400 or 500.

Figure 13:
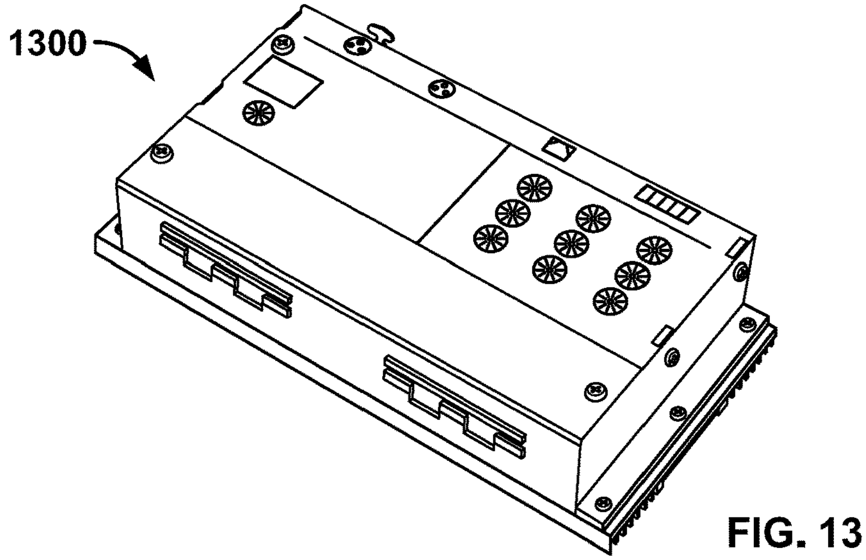
FIG. 13 shows apparatus that may be used in accordance with the principles of the invention.

FIG. 13 shows illustrative controller 1300. Controller 1300 may have one or more features in common with controller 104. Controller 1300 may have one or more features in common with controller 1200.

Figure 14:
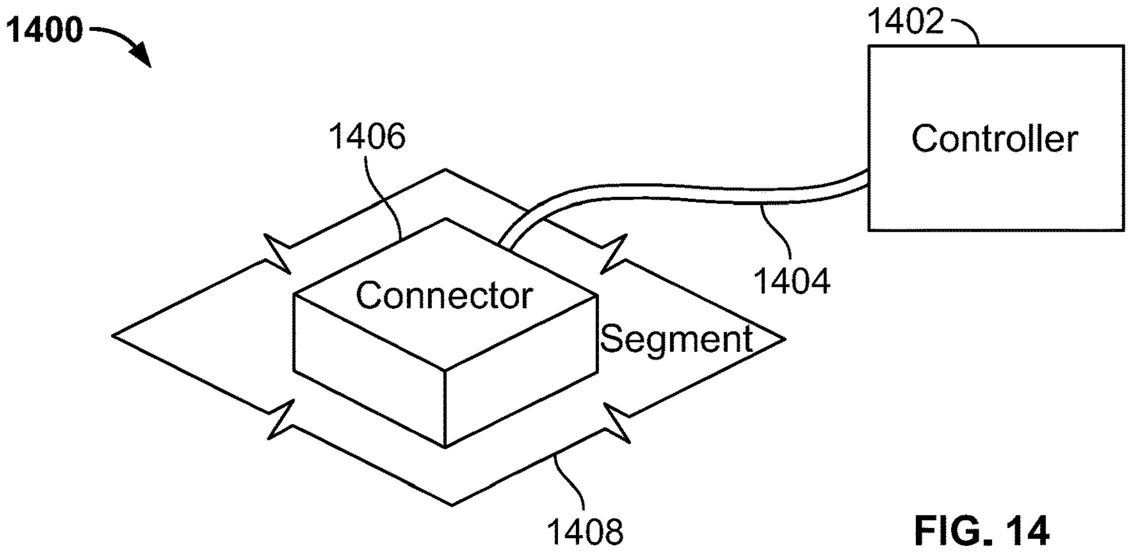
FIG. 14 shows schematically apparatus in accordance with the principles of the invention.

FIG. 14 shows schematically arrangement 1400. Arrangement 1400 may include controller 1402. Arrangement 1400 may include channel 1404. Arrangement 1400 may include connector 1406. Arrangement 1400 may include segment 1408.

Controller 1402 may have one or more features in common with one or more of controllers 104, 1200 and 1300. Channel 1404 may include a cable. Channel 1404 may include a wireless communication channel. Connector 1406 may have one or more features in common with a connector described in connection with light tape 600. Connector 1406 may have one or more features in common with a connector described in connection with light sheet 700.

Segment 1408 may have one or more features in common with segment $T_i$. Segment 1408 may have one or more features in common with segment $S_{i,j}$.

Controller 1402 may provide lighting control data to one or more ICs on segment 1408. The lighting control data may include a data packet. The data packet may include an address. The address may correspond to one or more of the ICs. The address may correspond to one or more LEDs on segment 1408. The address may correspond to one or more LEDs on a light tape. The address may correspond to one or more LEDs on a light sheet. The LEDs corresponding to the address may be controlled by a current regulator or regulators on a single IC. The LEDs corresponding to the address may be controlled by current regulators on different ICs.

Figure 15:
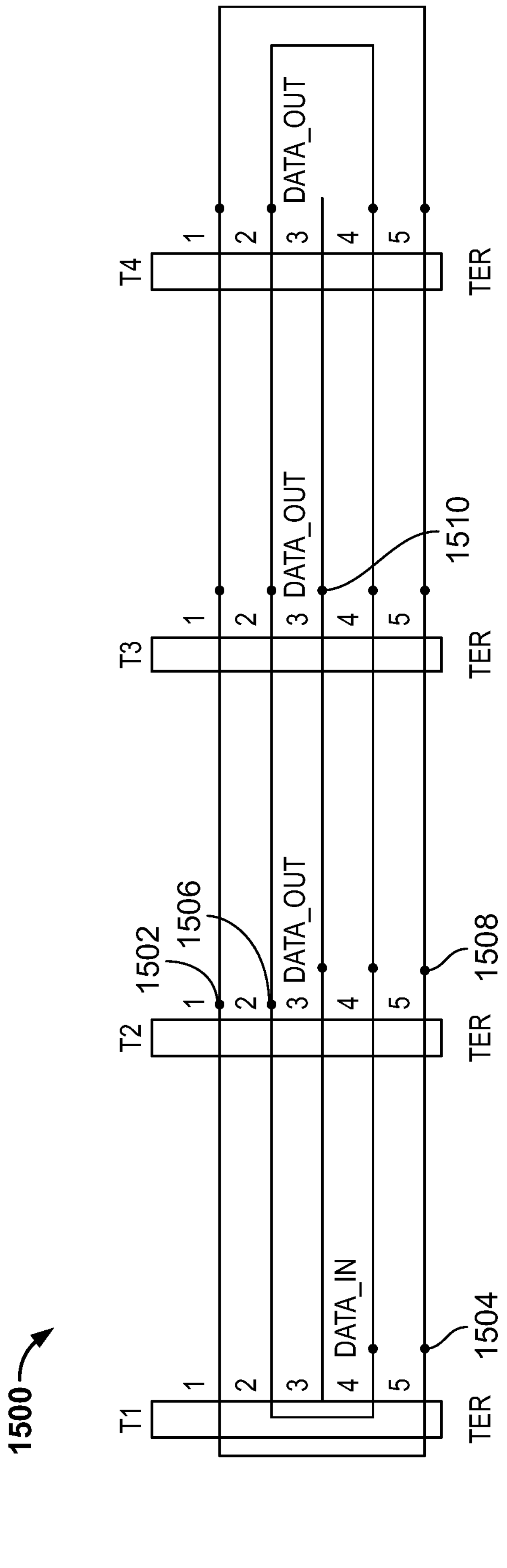
FIG. 15 shows schematically apparatus in accordance with the principles of the invention.

FIG. 15 shows schematically terminal layout 1500 for a connector such as 1406. Connector 1406 may connect with a circuit such as that shown in connection with light tape 600. Connector 1406 may connect with a circuit such as that shown in connection light sheet 700.

Connector 1406 may include a mounted component. The mounted component may be mounted on segment 1408. Connector 1406 may include a channel component. The channel component may be coupled to channel 1404. Terminal layout 1500 may be the layout for the mounted component. The channel component may have a terminal layout that is a mirror image of layout 1500.

Layout 1500 may be based on a connector body matrix of four columns (T1 . . . T4) and five rows. In each column, terminals 1 (e.g, terminal 1502) and 5 (e.g, terminal 1504) may provide VDD, terminals 2 (e.g, terminal 1506) and 4 (e.g, terminal 1508) may provide GND, and Terminal 3 (e.g, terminal 1510) may provide lighting control data. Because of the mirror symmetry, and the layout of VDD, GND and data terminals, the channel component can be operationally connected to the mounted component in a first orientation and in a second orientation that is rotated 180° about an axis normal to the page.

All ranges and parameters disclosed herein shall be understood to encompass any and all subranges subsumed therein, every number between the endpoints, and the endpoints. For example, a stated range of "1 to 11" should be considered to include any and all subranges between (and inclusive of) the minimum value of 1 and the maximum value of 11; that is, all subranges beginning with a minimum value of 1 or more (e.g. 1 to 6.1), and ending with a maximum value of 11 or less (e.g., 2.3 to 10.4, 3 to 8, 4 to 7), and finally to each number 1, 2, 3, 4, 5, 6, 7, 8, 10, and 11 contained within the range.

Thus, apparatus and methods for LED lighting have been provided. Persons skilled in the art will appreciate that the present invention can be practiced by other than the described examples, which are presented for purposes of illustration rather than of limitation. The present invention is limited only by the claims that follow.

What is claimed is:

1. Apparatus comprising:
light-emitting diodes ("LED"s) that are:
mounted to a lamina; and
in electrical communication with an integrated circuit that is mounted to the lamina;
wherein:
the integrated circuit is configured to:
receive input at three terminals:
a first terminal that is configured to receive a data packet including, for each of the LEDs, a corresponding light level;
a second terminal that is designated to receive an excitation voltage; and
a third terminal that is designated to receive a reference voltage; and
regulate LED-driving currents;
each of the LEDs is configured to emit light of a color that is different from that of each of the other LEDs; and
the colors of the LEDs are more numerous than the currents.

2. The apparatus of claim 1 wherein the colors are more numerous, by one, than the currents.

3. The apparatus of claim 1 wherein the colors are more numerous, by two, than the currents.

4. The apparatus of claim 1 wherein:
the LEDs number five LEDs; and
the currents number four currents.

5. The apparatus of claim 1 wherein:
the LEDs number more than five LEDs; and
the currents number more than four currents.

6. The apparatus of claim 1 further comprising a lamina; wherein the LEDs and the integrated circuit are mounted to the lamina.

7. The apparatus of claim 1 wherein other than the first terminal the integrated circuit has no terminal that is configured to receive a light level.

8. The apparatus of claim 1 further comprising, when:
the integrated circuit is a first integrated circuit, and
the currents are first currents,
a second integrated circuit that is configured to regulate second currents, each being distinct from the first currents and corresponding to a different one of the LEDs.

9. The apparatus of claim 1 wherein the LEDs include:
a red LED;
a green LED;
a blue LED;
a white LED having a first CCT; and
a white LED having a second CCT that is different from the first CCT.

10. The apparatus of claim 1 wherein the LEDs are mounted to the lamina; and include:
a white LED having a first CCT;
a white LED having a second CCT; and
a white LED having a third CCT.

11. The apparatus of claim 10 wherein:
the third CCT is different from the first CCT and the second CCT; and
the second CCT is different from the first CCT.

12. The apparatus of claim 1 wherein the LEDs include:
a white LED having a first CCT; and
a white LED having a second CCT;
wherein the second CCT is different from the first CCT.

13. The apparatus of claim 1 wherein the light levels correspond to a user command that conforms to a lighting format.

14. The apparatus of claim 13 wherein the format is a digital multiplexing format available under the tradename "DMX".

15. The apparatus of claim 1 wherein the data packet corresponds to a user command configured to change an operational state of at least one of the LEDs.

16. The apparatus of claim 15 wherein the user command conforms to a lighting format.

17. The apparatus of claim 16 wherein the format is a digital multiplexing format available under the tradename "DMX".

18. The apparatus of claim 15 wherein the LEDs include:
a red LED;
a green LED;
a blue LED;
a white LED having a first CCT; and
a white LED having a second CCT that is different from the first CCT.

19. The apparatus of claim 15 wherein the LEDs are mounted to the lamina; and include:
a white LED having a first CCT;
a white LED having a second CCT; and
a white LED having a third CCT.

20. The apparatus of claim 19 wherein:
the third CCT is different from the first CCT and the second CCT; and
the second CCT is different from the first CCT.

21. The apparatus of claim 15 wherein the LEDs include:
a white LED having a first CCT; and
a white LED having a second CCT;
wherein the second CCT is different from the first CCT.

22. The apparatus of claim 1 wherein the colors are more numerous, by one, than the currents.

23. The apparatus of claim 1 wherein the colors are more numerous, by two, than the currents.

24. Apparatus comprising:
light-emitting diodes ("LED"s) that:
emit a number of different colors; and
are:
mounted to a lamina; and
in electrical communication with an integrated circuit that is mounted to the lamina; and
integrated circuits that are configured to:
receive input at three terminals:
a first terminal that is configured to receive a data packet including, for each of the colors, a corresponding light level;
a second terminal that is designated to receive an excitation voltage; and a third terminal that is designated to receive a reference voltage; and regulate currents, each current corresponding to a light level of a different one of the colors;

wherein:

with respect to propagation of the data packet, the integrated circuits are arranged in series; and at least one of the integrated circuits is configured to regulate a number of currents that is less than the number of colors.

25. The apparatus of claim 24 wherein all of the integrated circuits are configured to regulate a number of currents that is less than the number of colors.

26. The apparatus of claim 24 wherein a first of the integrated circuits is configured to provide to a second of the integrated circuits a pointer that distinguishes between light levels administered by the first integrated circuit and light levels not administered by the first integrated circuit.

27. The apparatus of claim 26 wherein the data packet corresponds to a user command configured to change an operational state of at least one of the LEDs.

28. The apparatus of claim 24 wherein the colors include:

red;

green;

blue;

a first CCT white; and a second CCT white that is different from the first CCT.

29. The apparatus of claim 24 wherein the LEDs are mounted to the lamina; and the colors include:

a first CCT white;

a second CCT white; and a third CCT white.

30. The apparatus of claim 29 wherein:

the third CCT white is different from the first CCT white and the second CCT white; and the second CCT white is different from the first CCT white.

* * * * *